(12) United States Patent
Keshner et al.

(10) Patent No.: US 10,569,956 B1
(45) Date of Patent: Feb. 25, 2020

(54) SEQUESTRATION OF CARBON DIOXIDE INTO UNDERGROUND STRUCTURES

(71) Applicants: Marvin S Keshner, Sonora, CA (US); Erik Garth Vaaler, Redwood City, CA (US)

(72) Inventors: Marvin S Keshner, Sonora, CA (US); Erik Garth Vaaler, Redwood City, CA (US)

( * ) Notice: Subject to any disclaimer, the term of this patent is extended or adjusted under 35 U.S.C. 154(b) by 0 days.

(21) Appl. No.: 16/103,700

(22) Filed: Aug. 14, 2018

(51) Int. Cl.
| | |
|---|---|
| B65G 5/00 | (2006.01) |
| B01D 53/14 | (2006.01) |
| B01F 3/04 | (2006.01) |
| B01F 3/00 | (2006.01) |

(52) U.S. Cl.
CPC ......... B65G 5/005 (2013.01); B01D 53/1425 (2013.01); B01D 53/1475 (2013.01); B01F 3/04531 (2013.01); B01F 3/04978 (2013.01); B01F 3/04985 (2013.01); B01D 2252/103 (2013.01); B01F 2003/005 (2013.01); B01F 2003/04893 (2013.01)

(58) Field of Classification Search
CPC .................................. B65G 5/00; B65G 5/005
See application file for complete search history.

(56) References Cited

U.S. PATENT DOCUMENTS

| | | | |
|---|---|---|---|
| 6,190,301 B1 | 2/2001 | Murray et al. | |
| 8,388,918 B2 | 3/2013 | Zauderer | |
| 8,663,564 B2 | 3/2014 | Nowlan et al. | |
| 9,139,364 B1 | 9/2015 | Wang et al. | |
| 9,146,035 B2 | 9/2015 | Boulet | |
| 9,152,994 B2 | 10/2015 | Marino | |
| 9,169,778 B2 | 10/2015 | Allam | |
| 9,433,896 B2 | 9/2016 | Eisenberger | |
| 2011/0236134 A1* | 9/2011 | Oldenburg | B65G 5/00 405/59 |
| 2012/0058042 A1* | 3/2012 | Zauderer | B01D 53/62 423/432 |

OTHER PUBLICATIONS

McGrail, et al, "Field Validation of Supercritical CO2 Reactivity with Basalts", Environ. Sci. Technol. Lett. 2017, 4 (1), pp. 6-10.

* cited by examiner

*Primary Examiner* — Sunil Singh
(74) *Attorney, Agent, or Firm* — Shalini Venkatesh

(57) ABSTRACT

An apparatus comprises a separator, a compressor, a mixer and a pump. The separator operates on an input gas mixture comprising carbon dioxide gas and one or more other gases, providing a separated carbon dioxide gas output. A compressor compresses the separated carbon dioxide gas output, providing a second output comprising at least one of gaseous carbon dioxide and liquid carbon dioxide. A mixer mixes the second output with liquid water under pressure to provide a third output comprising: at least one of liquid carbon dioxide and gaseous carbon dioxide; and water with dissolved carbon dioxide. A pump pumps the third output into an underground structure such that components of the third output react with available rock surfaces to form stable carbonates.

18 Claims, 11 Drawing Sheets

Solubility of $CO_2$ gas as a function of gas pressure at 25, 50, 75 and 100 °C. Data points are from compilations by Duan and others (2006) and Spycher and others (2003); lines are calculated with PHREEQC.

SEQUESTRATION OF CARBON DIOXIDE INTO UNDERGROUND STRUCTURES

FIELD OF INVENTION

This invention relates in general to methods of reducing global warming, and more specifically to doing so by sequestering carbon dioxide to reduce the concentration of gaseous carbon dioxide in the earth's atmosphere.

BACKGROUND

In early 2018, the concentration of carbon dioxide in our atmosphere exceeds 400 ppm. This high level of carbon dioxide is considered to be one of the prime contributors to global warming, which is creating rising sea levels, more destructive storms, droughts and floods.

Many methods have been proposed to capture carbon dioxide from the smokestacks of electricity generating facilities that burn carbon-based fuels (eg. coal, oil, biomass, or natural gas). Other methods have been proposed to capture carbon dioxide directly from the air. Permanently storing (a.k.a. sequestering) the captured carbon dioxide at low cost has proven to be difficult.

Various authors have proposed storing carbon dioxide under high pressure in depleted oil or gas wells and then re-capping the wells. Unfortunately, the process of drilling and extracting the oil or gas from the well creates pathways by which the carbon dioxide can escape. Also, the depleted wells are often located far from any electricity generating facility. The significant cost of transporting the carbon dioxide over long distances negatively impacts the cost effectiveness of well storage in such cases.

Other authors have proposed storing carbon dioxide under high pressure in natural caverns. As in the case of wells, discussed above, the caverns will tend to leak gas, and the cost of transporting the carbon dioxide to the caverns makes this approach not cost effective.

Other authors have proposed liquefying the carbon dioxide and storing it deep under the ocean, in the hope that the high pressures and cold temperatures deep under the ocean would hold the carbon dioxide in place for a long time. This method is both expensive and not permanent enough. The carbon dioxide must be transported and compressed to a very high pressure, which is expensive. Also, over time, it will dissolve in the sea water and diffuse to the surface.

Recently, scientists in Iceland have dissolved carbon dioxide into a large volume of water and then introduced the solution into caves of igneous rock, such as volcanic rock or basalt, where a small fraction of the dissolved carbon dioxide reacts with the rock to form stable carbonates. In another study at the Pacific Northwest Laboratory, scientists forced carbon dioxide gas under very high pressure into deposits of basalt rock located 1250 meters below the surface. In each of these two experiments, some of the carbon dioxide gas was converted to a stable solid form. Unfortunately, the amount that was converted was too small for this approach to be useful for storing large amounts of carbon dioxide.

In all of these prior art methods, there is an initial phase requiring the separation of carbon dioxide from nitrogen and other trace gases in the exhaust of carbon-based electricity generating plants, and this separation has been expensive. In many cases, it has driven the price of sequestration so high that the value of the electricity generating fuel (e.g. coal or natural gas) is greatly compromised.

There is a natural process by which certain types of rock are weathered, and by which atmospheric carbon dioxide is converted into solid carbonates. Carbon dioxide in the air dissolves in rainwater to form a weak acid, carbonic acid (H2CO3). This acid interacts with rock to create carbonates. An example of this second reaction, with the rock mineral Feldspar, one of the most abundant types of rock in the Earth's crust, is indicated below.

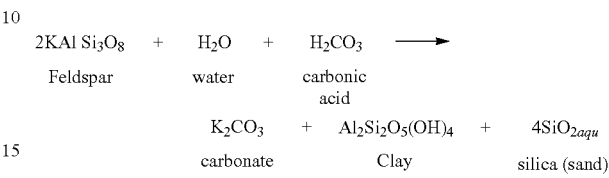

Hard rock and the carbon dioxide that is dissolved in water to form carbonic acid ($H_2O + CO_2 \rightarrow H_2CO_3$) are consumed. For this type of rock, the products are soluble carbonate, clay particles and SiO2 (the major component of sand). For rocks containing Ca, the carbonic acid forms $Ca(HCO_3)_2$ (calcium bicarbonate). Subsequently, water with dissolved calcium bicarbonate will react with other rocks that will raise the pH of the solution. When the pH is high enough, the calcium bicarbonate converts to $CaCO_3$, which deposits as limestone rock. Limestone is one of the Earth's great natural permanent stores for carbon and carbon dioxide.

The natural weathering of rock is well understood, but very slow. If we stopped burning all fossil fuels now, with only natural processes, it would take 1000 years to restore the level of carbon dioxide in the atmosphere back to its levels prior to 1950.

There have also been scientific studies to understand what limits the rates at which these natural rock weathering processes proceed. Like most chemical reactions, the reaction rate for the weathering process is proportional to the surface area of the rock that is exposed, to the concentration of carbon dioxide in the water, which determines the concentration of carbonic acid in the water, and to the degree that the carbonic acid is dissociated in the water, which is determined by the acidity of the solution and the concentration of bi-carbonate ($HCO_3^-$) and carbonate ($CO_3^{--}$) ions.

There is, therefore, a need for methods to sequester carbon dioxide in rock to form carbonates at rates higher than those that would occur naturally, without human intervention.

SUMMARY

Embodiments generally relate to methods, systems, and apparatuses for sequestering carbon dioxide in and around an underground structure, such as a cavern or a well, comprising rock or rocks that have been fractured and cracked by some means. The means may be human initiated, for example using hydraulic fracturing, or explosives, or may be the result of naturally occurring phenomena, such as earthquakes.

In one embodiment, an apparatus for sequestering carbon dioxide in and around an underground structure, comprising fractured and cracked rock, comprises: a separator, a compressor, a mixer and a pump. The separator operates on an input gas mixture comprising carbon dioxide gas and one or more other gases, providing a separated carbon dioxide gas output. The compressor compresses the separated carbon dioxide gas output to a pressure in a predetermined pressure range providing a second output comprising at least one of gaseous carbon dioxide and liquid carbon dioxide. The mixer provides a third output by mixing the second output with liquid water at a pressure in the predetermined range, the third output comprising: at least one of liquid carbon dioxide and gaseous carbon dioxide; and water with dissolved carbon dioxide. The pump pumps the third output into an underground structure under a pressure in the predetermined pressure range, such that components of the third output react with the exposed surface areas of the fractured and cracked rock in and around the underground structure to form stable carbonates.

In another embodiment, a system for sequestering carbon dioxide comprises: an underground structure, comprising fractured and cracked rock; a separator, a compressor, a mixer and a pump. The separator operates on an input gas mixture comprising carbon dioxide gas and one or more other gases, providing a separated carbon dioxide gas output. The compressor compresses the separated carbon dioxide gas output to a pressure in a predetermined pressure range, providing a second output comprising: at least one of gaseous carbon dioxide and liquid carbon dioxide. The mixer provides a third output by mixing the second output with liquid water at a pressure in the predetermined range, the third output comprising: at least one of liquid carbon dioxide and gaseous carbon dioxide; and water with dissolved carbon dioxide. The pump pumps the third output into an underground structure under a pressure in the predetermined pressure range, such that components of the third output react with the fractured and cracked rock in and around the underground structure to form stable carbonates.

In another embodiment, a method for sequestering carbon dioxide in and around an underground structure, comprising fractured and cracked rock, comprises: a first method for separating carbon dioxide gas from one or more other gases in an input gas mixture to provide a separated carbon dioxide gas output; a second method for compressing the separated carbon dioxide gas output to a pressure in a predetermined range, providing a second output; a third method for providing a third output mixture by mixing the second output with liquid water at a pressure in the predetermined range; and a fourth method for pumping the third output mixture under a pressure in the predetermined range into the underground structure, such that components of the third output mixture react with the fractured and cracked rock in and around the underground structure to form stable carbonates. The second output comprises: at least one of gaseous carbon dioxide and liquid carbon dioxide. The third output mixture comprises: at least one of liquid carbon dioxide and gaseous carbon dioxide; and water with dissolved carbon dioxide.

DETAILED DESCRIPTION

Figure 1:
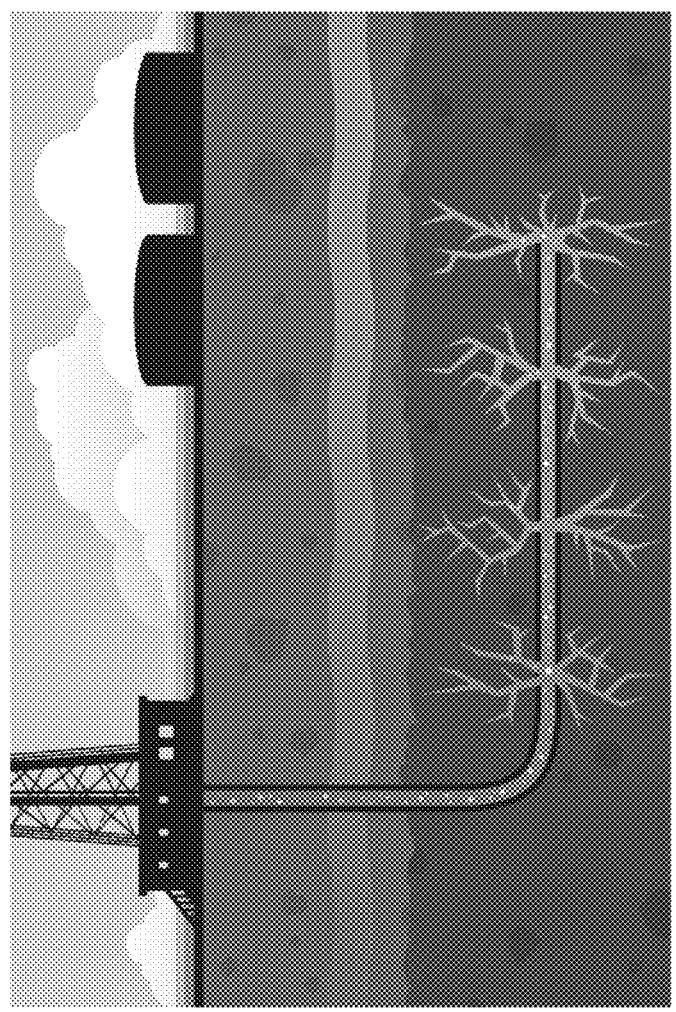
FIG. 1 (Prior Art) is an illustration of a typical fracked well showing regions of rock that are fractured, cracked and broken open by hydraulic fracturing (aka fracking).

Embodiments of the present invention provide energy-efficient methods and apparatus for separating gaseous carbon dioxide from the exhaust of electricity generating facilities that burn fossil fuels (coal, oil, natural gas) or other carbon based fuels (wood chips, corn stalks, etc) to generate electricity, and for sequestering the carbon dioxide in rock in and around underground structures, such as caverns or wells, in which the rock has been fractured and cracked using at least one of hydraulic fracturing, explosives, other human-initiated means, and earthquakes or other natural means. A liquid containing water and a high concentration of carbon dioxide is injected under high pressure (30-150 atm) into these underground structures, where the cracks in the rock allow the liquid to penetrate into the surrounding rock material, and where the fractured and cracked rock presents a large surface area that reacts with the carbon dioxide to form stable carbonates.

One embodiment separates carbon dioxide from nitrogen and other trace gases in the exhaust by compressing the fossil fuel exhaust to a high pressure, typically around 150 atm, and bubbling the compressed gas mixture into flowing water. For the same partial pressure of gas, water absorbs about 110 times more carbon dioxide than it does nitrogen, oxygen or other trace gases found the exhaust. The flowing water preferentially absorbs and carries away the carbon dioxide from the mixture, while allowing almost all of the other gases to pass through water and be collected in gaseous form. Compressing the exhaust gas to a high pressure greatly reduces the amount of surface area of gas bubblers required. It also reduces the flow rate of water, and the amount of water usage. These benefits result in lower operating and capital cost for the carbon dioxide separation. In other embodiments, the carbon dioxide can be separated by more conventional means (not using bubblers), which are briefly described later.

After separation, embodiments of this invention compress the carbon dioxide to a pressure in the range of 30-150 atm. In one embodiment, the carbon dioxide is compressed to 75 atm or higher. After compression, the carbon dioxide is mixed with water at the same pressure to form a 1-2 molar solution of carbon dioxide in water. Some of this dissolved carbon dioxide reacts with the water to form carbonic acid. The concentration of carbonic acid is proportional to the concentration of dissolved carbon dioxide. In another embodiment, to minimize the amount of water required, the carbon dioxide is partially liquefied so that carbon dioxide gas and carbon dioxide liquid are mixed with water. This can result in a concentration of carbon dioxide in the mixture about 10 times greater than the maximum amount that would dissolve in water. Like oil, carbon dioxide is made up of non-polar molecules. Like oil and water, liquid carbon dioxide and water do not easily mix and stay mixed. One embodiment of this invention uses special mixing techniques to increase the amount of time before the non-dissolved liquid carbon dioxide and the water will separate.

In some embodiments, the output "mixture" is simply a highly concentrated solution of carbon dioxide in water (which forms a solution of carbonic acid). In some embodiments, the output mixture is literally a mixture that includes carbon dioxide gas and carbon dioxide liquid in addition to a solution of carbon dioxide and carbonic acid in water. In the remainder of this disclosure, the term "mixture" is used to encompass either a solution or a literal mixture, as convenient.

Finally, the output mixture is pumped or otherwise injected under high pressure (30 to 150 atm) into an underground structure, in which the rock has been fractured and cracked, using hydraulic fracturing, explosives, earthquakes and other natural means, or by other means. (A discussion of hydraulic fracturing, commonly known as fracking, is presented below, with reference to FIG. 1.) The mixture penetrates the rock along the breaks and fractures in the cracked rock. The very high surface area of the broken and fractured rock reacts with the carbonic acid to form carbonates and bi-carbonates. The greater the surface area of exposed rock, and the greater the concentration of carbonic acid, the faster the reaction will proceed. Any liquid carbon dioxide, the water with the dissolved carbon dioxide, and whatever carbonic acid that does not react with the rock closest to the interior of the underground structure flow to other rock through the fractures and breaks. As the carbon dioxide dissolved in the water reacts with rock and is used up, additional carbon dioxide from the mixture of liquid and/or gaseous carbon dioxide and water will dissolve into the water to replace it. Eventually, all the liquid and/or gaseous carbon dioxide will dissolve in the water, and form carbonic acid. The carbonic acid in the water will react with rock surfaces to form carbonates and bi-carbonates.

Traditional oil and gas wells have held gas under pressure for millions of years. They do not have cracks and fractures through which a gas or a liquid can flow into the surrounding rock. In some cases, the rock surface that defines the boundary of the volume of the well is smooth, hard and not porous. Compared to the volume of the well, the available surface area of rock for reaction with carbonic acid to form carbonates is small. In other cases, some thickness of the rock around the well may be porous, but again the surface area of rock available to react with carbonic acid is too small to create a rapid and economical conversion of carbon dioxide into stable carbonates. The rock walls that form these wells could be fractured and cracked, for example, with explosives. If deployed deep in the well and away from the bore hole into the well, the bore hole would be unaffected. In this way, the rock surface of a depleted oil or gas well could be fractured and cracked such that a liquid mixture injected into the well could penetrate through newly created cracks in the rock and into the rock surrounding the well. These new cracks and fractures would create a huge surface area of rock available for reacting with carbon dioxide in the injected liquid.

Some natural caverns are formed in rock that has been fractured and cracked by natural processes like tectonic plate movement, uplifting, or earthquakes. Some of these structures may be sufficiently well sealed such that a liquid mixture can be injected under high pressure and not immediately flow out though large holes. For these natural caverns, the mixture would maintain pressure in the cavern and flow out through many small cracks in the rock walls into the surrounding rock and a large amount of surface area in the surrounding rock would be available to react with the carbon dioxide in the mixture.

Other natural underground structures may be large deposits of crushed or ground rock (gravel or sand). In some cases, these are formed by the crushing and scraping action of glaciers. In other cases, these are formed by freezing water that cracks rock. For this invention, these structures are also considered to be examples of caverns. The space inside the structure is filled with gravel or sand, but there is still much empty space between the pieces of gravel or sand into which the mixture can be injected and through which the mixture can move to access more volume of rock. Deposits of gravel or sand naturally have a huge surface area of rock. As above, these structures must be sufficiently well sealed such that a liquid mixture can be injected under high pressure and not immediately flow out and release the pressure. If the pressure drops, some of the carbon dioxide in solution with water will come out as carbon dioxide gas and some of the liquid carbon dioxide in the mixture will convert to gas.

Wells created by hydraulic fracturing (or Fracking) are well suited for sequestering carbon dioxide. They have a huge surface area of cracked and fractured rock. Liquid injected under pressure into the well flows through the cracks and into the surrounding rock. During the fracking process, water is injected under pressure into the well. Once the rock is cracked, most of this water flows into the surrounding rock. The well and its surrounding rock create a huge volume of rock with which the injected mixture can react. A fracked well and the cracking and breaking of the rock during the fracking process are illustrated in FIG. 1. Such a well may be made by vertical drilling to the desired depth (e.g. 1.6 km) and then horizontal drilling to the desired length (e.g. 1.6-3.2 km).

Hydraulic fracturing is a process for creating wells into which water is forced under high pressure to fracture and break the layers of rock deep underground. Fracked wells are currently used to extract oil and natural gas from shale rock. The fractures and breaks allow the natural gas or oil to come out of the layers of rock and be collected. As part of the process of fracking, grains of sand (or ceramics) are carried by high pressure water and forced into the breaks and fractures in the rock to keep them open after the water pressure is reduced. After a well is fracked and the oil or gas is collected, the breaks and fractures in the rock remain open. Most of the water used for fracking flows into the ground through these cracks and fractures, and is not recovered.

Hydraulic fracturing (fracking) cracks the rock deep underground and exposes a huge amount of rock surface. Some of the rock may be shale that contains oil or natural gas, other rock in the vicinity of the well may be other types of rock. In some embodiments of this invention, a highly concentrated solution or mixture of carbon dioxide and water is pumped under high pressure into a fracked well and flows into the cracks and crevices in the rock that were opened by the fracking. Compared to rock surfaces exposed by the natural weathering of intact rock, the exposed rock surface in a fracked well is thousands of times greater.

As described above, it is well known that carbon dioxide dissolved in water will form carbonic acid that will react with rock to form carbonates. The carbonates are stable. They remain in the ground and effectively sequester carbon dioxide from the air. For almost all types of rock, water is required for the reaction to form and transport carbonates. However, in most prior art, carbon dioxide is injected underground without adding water. In one prior art case in which carbon dioxide is dissolved in water, the solution is very dilute. The reaction rates are slow, and the amount of carbon dioxide that is converted into carbonates is too small to be of practical use as a method of sequestration.

Embodiments of this invention greatly increase the rate at which carbon dioxide is converted to carbonates by combining three factors:
dissolving very high concentrations of the carbon dioxide in water, and/or mixing even higher concentrations of carbon dioxide gas and/or liquid with water,
delivering the mixture of carbon dioxide in water, liquid carbon dioxide and/or carbon dioxide gas under high pressure to the rock surfaces of interest, so that the concentration of carbon dioxide dissolved in water remains very high, and
pumping the highly concentrated carbon dioxide and water solution or mixture, under high pressure, into an underground structure, such as a well or cavern, and forcing it into rock that has been cracked and fractured by some means. By using a well or cavern, with cracked and fractured rock, the highly concentration solution or mixture will come into contact with a greater volume of rock, and with rock having a much greater surface area with which to react than would be encountered in many caverns or in conventional oil or gas wells.

As mentioned above, the highly concentrated carbon dioxide and water solution or mixture may be pumped or injected into an oil or gas well, or a cavern, in which the rock surrounding the well or cavern has been cracked by some means, such that the mixture can be injected and held at high pressure as it flows out through cracks in the rock. For the remainder of this document, the term "fracked well" is defined to include any underground cavern or well that has an abundance of cracked and fractured rock, that was created naturally or by any other means, including hydraulic fracking, explosives, mechanical rock cracking, earthquakes, and so forth.

The combination of these three factors—the presence of water with a high concentration of carbon dioxide, the high carbon dioxide concentration created and maintained by high pressure, and the very large surface area of exposed rock—greatly increases the rate at which carbon dioxide reacts with the rock and is consumed to form carbonates that remain in the ground. For example, for natural rock weathering, the concentration of carbon dioxide in rainwater is about $10^{-5}$ moles per liter of water. At a carbon dioxide pressure of 70 atm, the concentration of carbon dioxide is 1.4 moles per liter of water, more than 100,000 times greater. The resulting rate of carbon dioxide sequestration is high enough to be economical, and may better keep pace with the rate at which carbon dioxide is currently being generated. Embodiments of the current invention accomplish these increases at a cost that is a small fraction of the value of the electricity produced by the fossil fuel burning that generates the carbon dioxide to be sequestered.

Some embodiments of this invention also capture the water vapor from the exhaust gases of fuels like natural gas and wood chips to minimize the amount and the cost of additional water that would have to be supplied to form stable carbonates and sequester the carbon dioxide produced. As we can see from the chemical equation below, two molecules of water are created for every molecule of natural gas burned and carbon dioxide created.

$$CH_4 + 2O_2 \rightarrow CO_2 + 2H_2O$$

For the rock weathering process, the carbon dioxide must dissolve in water and form carbonic acid:

$$CO_2 + H_2O \rightarrow H_2CO_3$$

When reacting with some types of rock, we require an additional water molecule for each carbon dioxide molecule:

$$2KAlSi_3O_8 + H_2O + H_2CO_3 \rightarrow K_2CO_3 + Al_2Si_2O_5(OH)_4 + 4SiO_{2aqu}$$

As burning natural gas generates two water molecules per molecule of carbon dioxide, and as two water molecules are needed to convert one molecule of carbon dioxide to carbonate in rock containing minerals like Feldspar, indicated above, it is apparent that capturing the water produced during burning can yield the amount necessary to sequester the carbon dioxide as carbonates in the ground.

Water is a necessary input to embodiments of the present invention, as described above, to act on carbon dioxide to sequester carbon. Some water is physically consumed, some is used as an intermediary in the chemical reactions necessary to convert carbon dioxide into carbonates, and some is used to transport soluble carbonates and bi-carbonates to locations where they react with other rock to deposit insoluble carbonates. Some rock formations may have sufficient hydration or free water, but some do not. Capturing the water produced in the burning of various fuels is an important part of some embodiments of this invention, lowering the requirements for additional water, and lowering the overall cost of the carbon sequestration process.

Where water is expensive, it would be best to use only the water recovered from the exhaust. For example, a 370 MW electricity generating facility, burning natural gas, will produce 1 billion liters of water per year. If 25% more water is needed as an intermediary or to transport carbonates, corresponding embodiments of this invention would use an additional 0.25 billion liters of water per year, or about the amount of water per year used by about 600 families. If no water is captured from the exhaust, then an additional 1.25 billion liters of water per year would be required, enough to support 3100 families. This illustrates the importance of capturing water from the exhaust and minimizing the amount of extra water necessary.

Some of the carbon dioxide and carbonic acid reacts with the rock surface to form carbonates that are insoluble in water. These are deposited locally. Most of the carbon dioxide, carbonic acid and some bicarbonates and carbonates remain dissolved in the water until the water has penetrated more rock and the dissolved carbon dioxide and carbonic acid are used up. The fracked wells tend to be more than 1-2 km underground, where the pressure is very high. At depths below 300 m, the pressure is often in excess of 30 atmospheres. The amount of carbon dioxide that dissolves in water goes up with the partial pressure of carbon dioxide gas. At a carbon dioxide gas partial pressure of 30 atmospheres, the dissolved concentration of carbon dioxide is 1 molar, close to the maximum amount of carbon dioxide that will dissolve in water, even at much higher pressures. As the water with dissolved carbon dioxide moves through the cracks in the rock and reacts with more rock, the carbon dioxide is used up. Eventually, the cumulative effect of the reaction with rock depletes the concentration of carbon dioxide and carbonic acid and increases the pH of the water solution. When the pH of the solution increases, dissolved bicarbonates and carbonates begin to deposit as solid carbonates, such as limestone (CaCO3).

Most of the water used for fracking penetrates into the rock layers and remains underground. This demonstrates that the rock is cracked and the pressurized water can flow out of the well, through the cracks, and into the rock surrounding the well. Once outside the well, almost all of the water with a high concentration of carbon dioxide and carbonic acid will also find places to remain underground until all of the dissolved bi-carbonates and carbonates are converted into solid carbonates like limestone. Unless a strongly acid solution is intentionally pumped into the well and thereby into the ground at a future time, the carbon dioxide from the electricity generation facility will be safely and permanently stored deep underground as carbonates.

Assuming that the water with dissolved carbon dioxide or a mixture of un-dissolved carbon dioxide and water can penetrate to a radius of 0.3 km from the well shaft, the total volume of rock available around a typical fracked well (1.6 km in length) would be circa 0.5 cubic km. The oil or gas bearing rock of a fracked well is typically shale or sandstone, and not likely to react with carbon dioxide to form limestone. Fortunately, the oil or gas bearing rock of a fracked well is only a small fraction of the total amount of rock available and the total amount of rock that has been cracked during the fracking process. If only 2% of the 0.5 cubic km volume was available for the mixture of carbon dioxide and water to deposit solid carbonates, the available volume would be $10^7$ m3. At a density of 400 kg/m3 for carbon sequestration, this volume would hold $4*10^9$ kg of carbon, stored as solid carbonates. A natural gas fueled electricity generating facility, producing 370 MW of electricity, produces 10 kg of carbon (as carbon dioxide) per second. Therefore, a single fracked well should be able to store $4*10^8$ seconds of carbon dioxide production, which is about 12.5 years. For comparison, the best natural gas well in the Marcellus shale region yields enough natural gas to produce 370 MW of electricity for about 9 years. Thus, a depleted fracked well should be able to accept and sequester about as much carbon dioxide as is produced by burning all the natural gas extracted from that well.

In contrast to prior art approaches, embodiments of this invention do not attempt to store the carbon dioxide in gaseous or liquid form, but as a solid carbonate rock, underground. Also in contrast to prior art approaches, embodiments do not use caves, caverns, traditional oil or traditional natural gas wells to store the carbon dioxide, unless, by some method, the rock within these underground structure has been fractured and cracked so that a pressurized liquid can flow through the fractures and cracks and into the surrounding rock. Embodiments either dissolve all the carbon dioxide in water, or create a mixture of water with dissolved carbon dioxide, mixed with liquid and/or gaseous carbon dioxide. The mixture has the advantage of using 10-20 times less water. This is significant where water resources are limited, and also reduces pumping costs. The water with dissolved carbon dioxide, or the mixture containing water with dissolved carbon dioxide, mixed with liquid and/or gaseous carbon dioxide, is pumped into a fracked well. In the case of the mixture, as the carbon dioxide dissolved in the water is used up by reacting with rock, it is replenished by portions of the liquid or gaseous carbon dioxide, dissolving in turn in the water, then reacting with rock, and so on, until all the carbon dioxide is used up.

By using underground structures in which the rock has been fractured and cracked ("fracked"), embodiments of this invention expose the solution or mixture to a large volume of rock that has an enormously increased rock surface area. The presence of fracked rock, with increased surface area, substantially increases the reaction rate at which carbon dioxide is converted into stable carbonates. It also substantially increases the amount of carbon dioxide that can be injected, absorbed and converted into stable carbonates per volume of rock.

The mixture has a concentration of carbon dioxide that is 100,000-1,000,000 times greater than found in prior art. Pumping it underground at high pressure assures that the carbon dioxide does not escape and the mixture retains its high concentration. Underground structures should be chosen and modified such that they can hold a high pressure of at least 30 atm. Lower holding pressures may be workable, but some of the carbon dioxide will bubble out of the mixture at lower pressures.

The cost of transporting carbon dioxide from the electrical generation facility to the location of a carbon dioxide sequestering facility could significantly increase the cost of sequestration. It could make embodiments of this invention less economically attractive. To minimize the total cost of generating electricity and sequestering the carbon dioxide produced, in one embodiment of this invention, the electricity generating facility and a series of fracked natural gas or oil wells are co-located. Consider the case where a fracked well has been depleted, and a new fracked well is created to supply natural gas or oil to the electricity generation facility. The carbon dioxide subsequently produced at the facility from the latest fracked well may be sequestered into the rock of the depleted fracked well. This is a sustainable approach. New wells are created to access the gas trapped in more areas of rock. Old wells are used to sequester the carbon dioxide in the form of solid rock. Both the cost of transporting the natural gas and of transporting the carbon dioxide is greatly reduced. Instead, the electricity is transported to the locations where it is consumed. Also, the depleted, fracked well is reused. The re-use of a depleted well avoids the cost of fracking a new well simply to sequester carbon dioxide.

Consider the natural weathering process which dissolves carbon dioxide into rainwater. It exposes the surface of hard rock to the rainwater with the dissolved carbon dioxide. The carbon dioxide reacts with the water to form carbonic acid, which then reacts with the surface of the rock to form carbonates. Overall, the carbon dioxide is stored in the ground as rock composed of various carbonates. The natural process is a very slow process, taking 1000 years to significantly alter the concentration of carbon dioxide in the air. In embodiments of this invention, the concentrations of carbonic acid and carbon dioxide in the water solution or mixture are increased by factors of 100,000-1,000,000. The surface area of the rock is greatly increased by whatever rock cracking and fracturing process is used to create the fracked cavern or well. A pipeline to access to this increased surface area of fractured rock is also provided by the design of a fracked well. Thus, embodiments of this invention increase the rate of the sequestration reaction enormously, enable the rate of sequestering to be practical, and enable the cost of sequestering carbon dioxide to be economical.

Figure 2:
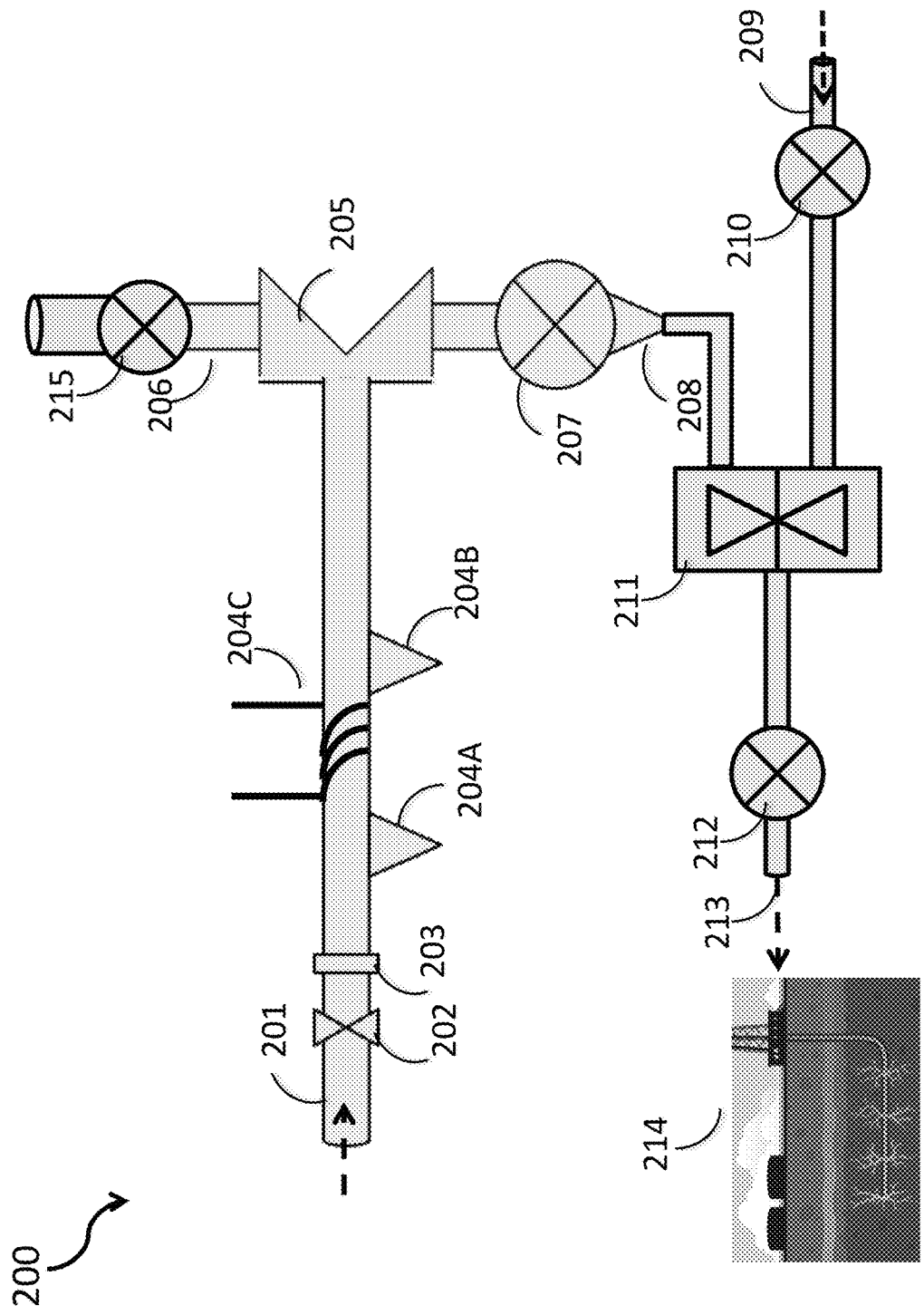
FIG. 2 is an illustration of an apparatus according to some embodiments of the current invention.

FIG. 2 schematically illustrates an apparatus 200 according to some embodiments of the current invention. The initial section of apparatus 200, at the top of the figure, comprises: gas pipe 201 which captures the exhaust gases from a natural gas turbine, coal fired, or other carbon based electricity generating facility; one or more fans 202 which move the exhaust gas along the pipe, as needed; one or more particle filtration devices 203; and a cooling system 204C and water traps 204A and 204B that work together to liquefy most of the water vapor present in the exhaust and trap it, so that it can be easily removed from the exhaust gas pipeline.

The exhaust gas entering pipe 201 is captured from the electricity generating facility and transported through a length of pipe sufficient to allow it to cool to about ambient temperature. Forced air cooling around the pipe may be advantageous. For burning fuels that produce particles (like coal or wood chips), device or devices 203 are particularly important in filtering out these particles using screens, chemical filters, electrostatic precipitators, water sprays or other well known methods.

In some embodiments, cooling system 204C is used to cool the exhaust gas from ambient temperature down to almost 0 C. The water can then be captured by one or more water traps 204A and 204B, which may simply be low points in the pipe, as liquid water, which can be used later in the process, as mentioned above, and as will be described further below. In embodiments where the exhaust gas is only cooled to room temperature, using air at ambient temperature, more water remains in the exhaust gas mixture, and may only liquefy later, when the exhaust gas mixture reaches compressor 207, described below.

The main components in the remainder of apparatus 200 are separator 205, compressor 207, mixer 211, and pump 212. Separator 205 separates the carbon dioxide gas from other gases (mostly nitrogen) present in the exhaust, sending these other gases out through exhaust pipe 206. If the gas was compressed as part of the separation process, then the separated nitrogen gas will be decompressed in an expander 215 to recover some of the energy used to compress the gas mixture. Compressor 207 compresses the separated carbon dioxide to a high pressure, and in one embodiment to a pressure of at least 70 atm, at a temperature below 31 C, so that at least some of the carbon dioxide will liquefy. The output from compressor 207 is passed through the pipe 208 to mixer 211, where the gaseous and/or liquified carbon dioxide is mixed with pressurized water that is delivered to 211 along pipe 209 using water pump 210. Pump 212 then operates on the pressurized output mixture to deliver it through pipe 213 into a fracked cavern or well.

Prior to the present invention, several different types of apparatus have been developed to separate gaseous nitrogen from gaseous carbon dioxide. These include: gaseous diffusion through membranes, separation using a selective material like Zeolite, counter flow of solvent and gas through packed columns, centrifuge of the gas mixture, or cryogenic liquefaction or solidification of one or more of the gases, then physical separation or fractional distillation. These all will work, but the separation is slow and moderately expensive. Some greatly favor compressing the gases to 5-500 atm before separating them. Others may work adequately with the input gas mixture at 1-10 atm. Separation is one of the larger costs in this overall process and has made the sequestration of carbon dioxide not economical in the past.

Figure 3:
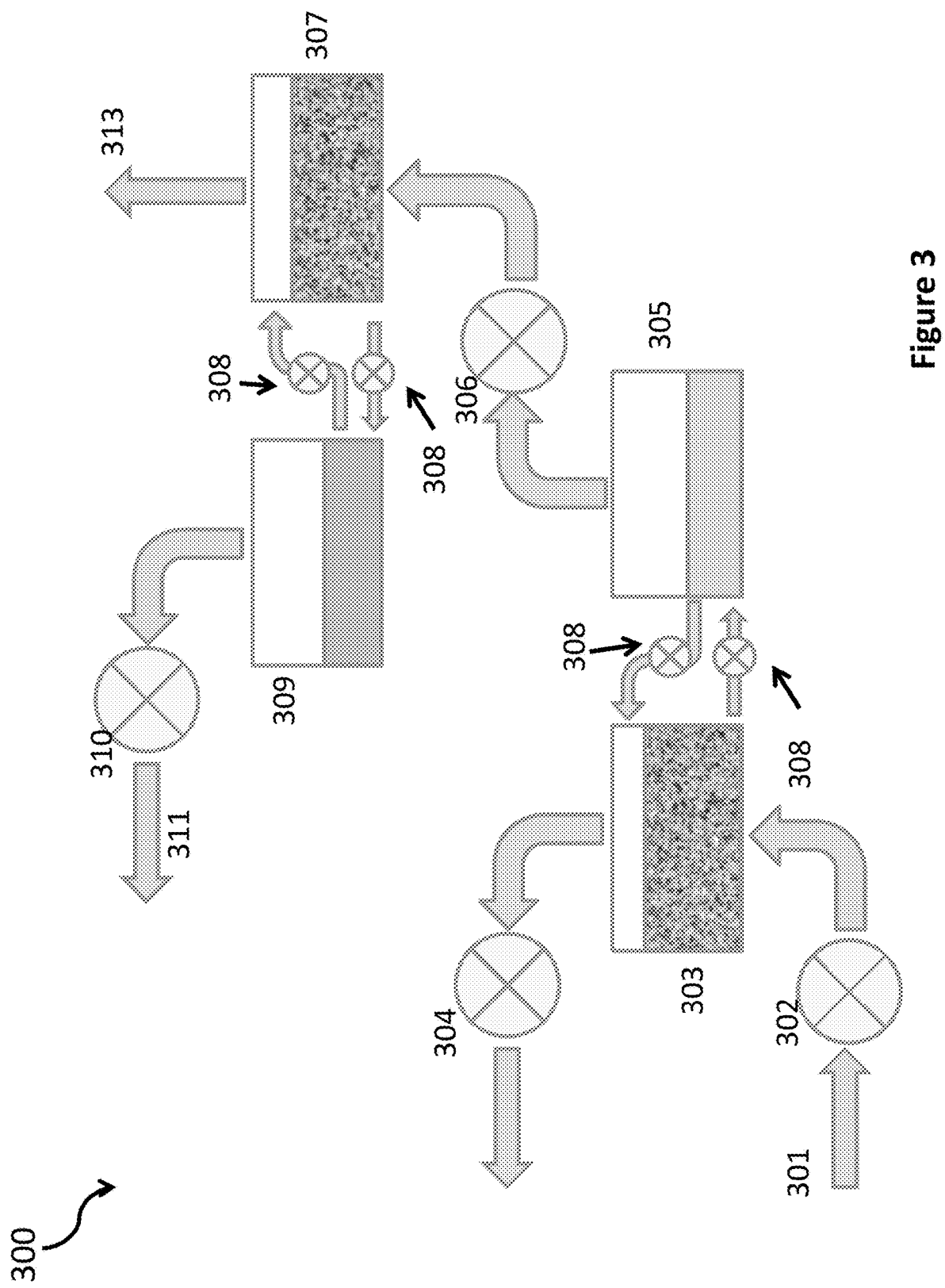
FIG. 3 is an illustration of a separator within an apparatus according to one embodiment of the current invention.

FIG. 3 illustrates separator 300 according to one embodiment of the present invention. Compressor 302, which may be either a multi-stage rotary turbine compressor or a multi-stage rotary centrifugal compressor, compresses exhaust gas 301 from 1 atmosphere pressure to a higher final pressure. In some embodiments, the final pressure is about 150 atmospheres. The compression is done using many stages so that the compression at each stage is 2:1 or less; in this way, each stage of the compressor can be cooled and kept within 30 C of room temperature, resulting in an overall compression process that is as close to isothermal as possible. Isothermal compression requires much less energy than adiabatic. In other embodiments, the compression can be to a final pressure that is higher or lower than 150 atmospheres, in the range of 5-500 atm. With higher pressures in the upper part of this range, the energy required to compress the gas will be greater. Also, the complexity and cost of the compressor will increase. With lower pressures, it may be more difficult to separate the carbon dioxide efficiently.

Figure 4A:
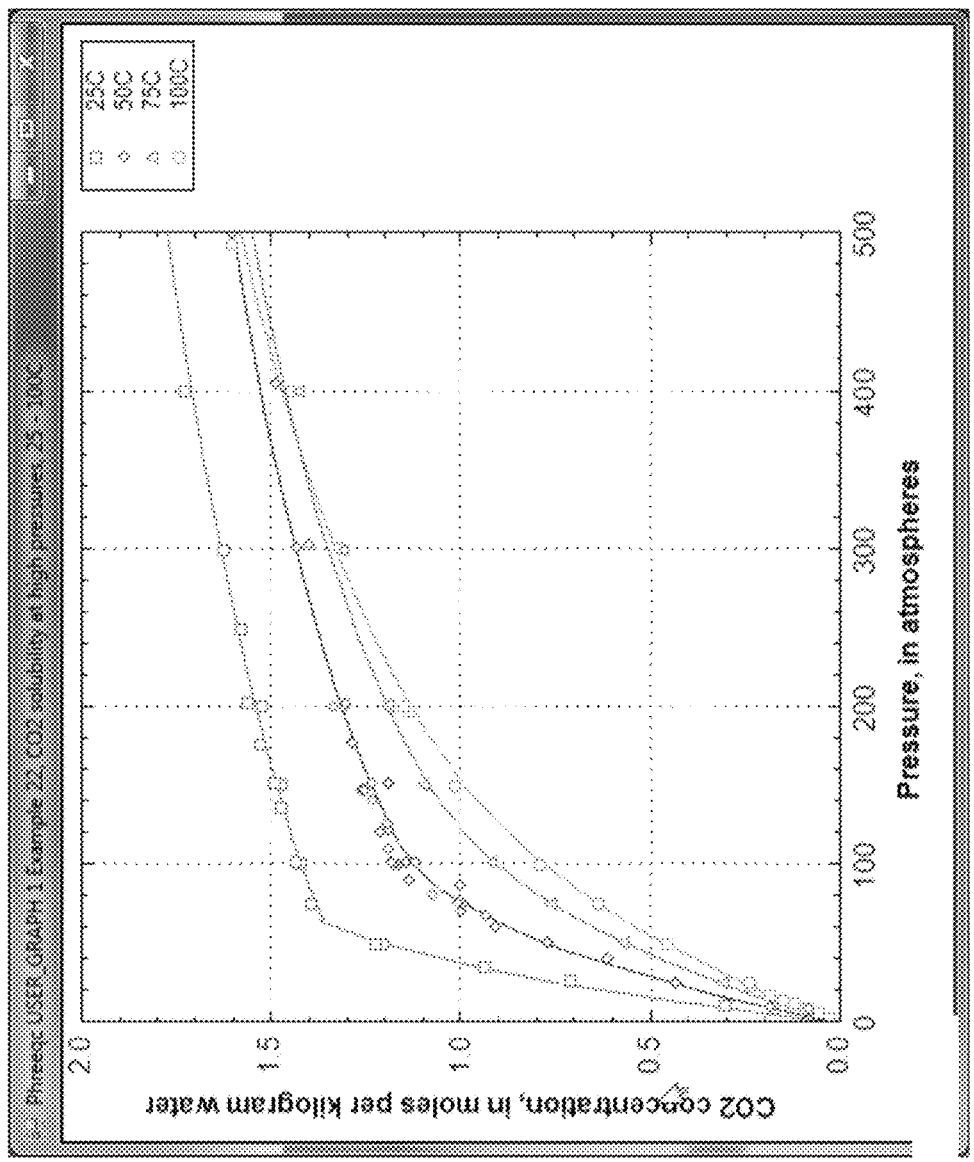
FIG. 4A (Prior Art) is a diagram showing the concentration of dissolved carbon dioxide in water as a function of the pressure of carbon dioxide in the gas phase FIG. 4B (Prior Art) shows solubility in water as a function of temperature for carbon dioxide and nitrogen.
Figure 4B:
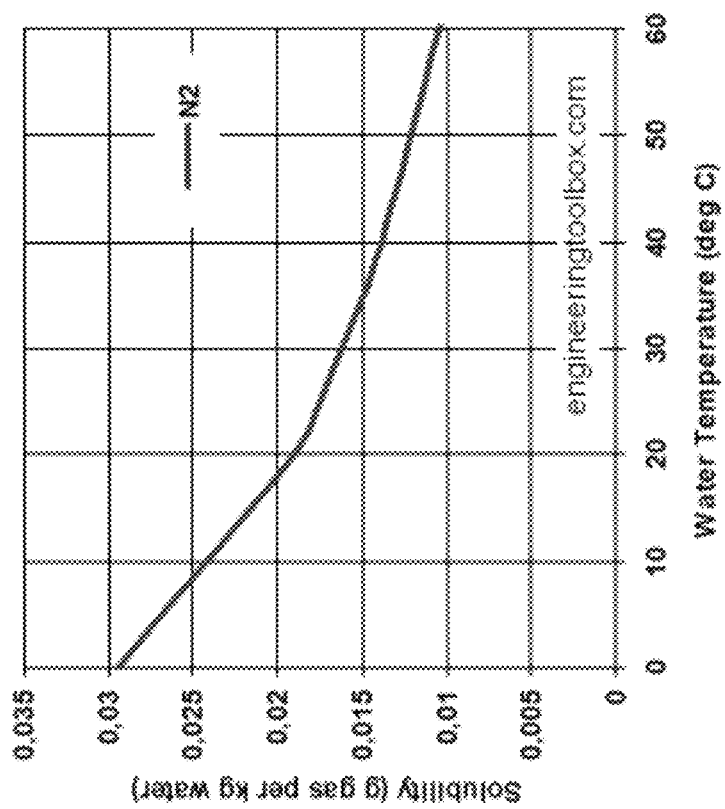
Figure 4B:
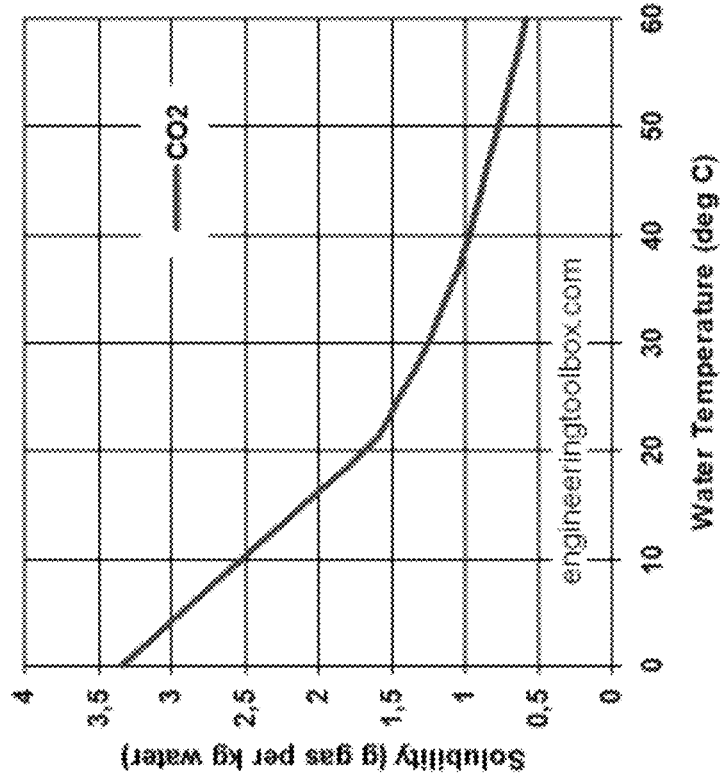

In the FIG. 3 embodiment of this invention, carbon dioxide is separated from nitrogen and other trace gases by bubbling it through water in a counter-flow bubbler chamber (303, 307) at a gas pressure of around 150 atm. When burning natural gas, the exhaust gas mixture will consist of roughly 86% nitrogen, 12% carbon dioxide and 0.7% water vapor (at 1 atm and 0° C.). When burning dry coal, the ratios will be roughly 78% nitrogen, 21% carbon dioxide and 0.7% water vapor. At a total pressure of 150 atm, the partial pressure of carbon dioxide would be 18 atm for natural gas, and 31.5 atm for coal. At partial pressures of carbon dioxide below 75 atm, the amount of carbon dioxide that will dissolve in water at 0° C. is equal to 3.4 grams per liter per atm times the partial pressure of carbon dioxide in atmospheres. This is shown in FIGS. 4A and 4B. By comparison (see FIG. 4B), the amount of nitrogen that will dissolve is almost 110 times lower; it also scales linearly with the partial pressure of nitrogen over a wide range of pressures. Thus, water has a selectivity for carbon dioxide and can be used to separate carbon dioxide from nitrogen, and similarly from other traces gases (oxygen, argon, etc.). With an input exhaust gas composition of 86% nitrogen and 12% carbon dioxide, the water flowing through the bubbler chamber will dissolve almost 16 times more carbon dioxide than nitrogen.

The bubbles can be formed in chambers 303, 307 using readily available commercial spargers, made from porous sintered stainless steel, glass or other acid resistant materials that will not react with the acidity of the carbon dioxide dissolved in water. Commercially available spargers have been used to carbonate soda water, to oxygenate sewage, and for many chemical reactions that require dissolving gas in liquids. One can also make spargers by laser drilling holes in a stainless-steel plate. In many cases, the stainless steel is coated with one of a variety of materials (eg. metal oxides, Teflon or other plastics) that modify the surface tension at the surface of the bubbler, and thereby, control the size of the bubbles.

The carbon dioxide will be strongly absorbed as it bubbles through the water. The water with dissolved carbon dioxide is then pumped from each chamber 303, 307 into an adjacent chamber (305, 309 respectively). Each adjacent chamber is maintained at a pressure below 0.5 atm by feedback with a compressor (306, 310 respectively). At this low pressure, very little carbon dioxide can remain in solution in the water. Almost all of it escapes into the low gas pressure region above the water, from where it is collected by the compressor. This is similar to the process by which carbon dioxide in soda water escapes into the air after the pressure in the can or bottle is released.

Only a small percentage of the nitrogen entering bubbler chambers 303, 307 from compressors 302, 306 will be absorbed and transported by the water. Almost all the nitrogen simply bubbles through the water and out the top of the bubbler chamber. It can be collected where the gas bubbles exit from the water. The energy of the compressed nitrogen can be recovered in an expander 304 and then released to the atmosphere, or it can simply be released to the atmosphere through a port 313. Much more nitrogen is available after the first stage of separation, at bubbler 303, hence positioning an expander here can recover a significant portion of the energy used to compress the input gas. After the second stage of separation, at bubbler 307, much less nitrogen is available. Hence, an expander may not be worth the cost, and a simple release port may be used as illustrated. In another embodiment, the nitrogen at port 313, can be introduced into a later stage of a multi-stage expander (304), where the pressure at port 313 is a good match to the pressure at the later stage of the multi-stage expander.

Pairs of pumps 308 are used to transport liquid and gaseous materials between bubbler chambers 303, 307 and their adjacent chambers 304, 309. Pumping the water from a chamber at low pressure (circa 0.5 atm or less) into a chamber at high pressure (eg. 150 atm) and back is a little tricky. It takes a lot of energy to pump the water from a low pressure to a high-pressure chamber. On the other hand, one gets back the same amount of energy when the water returns from the high pressure to the low-pressure chamber. One can use the energy gained going from high to low pressure to power the pump that pushes the water from low to high pressure. In one embodiment, the two pumps 308 in each pair are hooked together mechanically or electrically so that energy will flow from one to the other. As long as the water flows through the pumping mechanism and not through leakage paths around the pumping mechanism, energy will be generated when the water travels from high to low pressure. This energy will exactly equal the energy required to pump the same amount of water from low to high pressure. In practice, the only extra energy required will be that which is necessary to overcome the friction in the pipes and pumps, and any leakage paths in the pumps.

In the FIG. 3 embodiment of this invention with the exhaust from a natural gas fired system, two stages of separation are used. In the first stage, with a total compression to 150 atm, the partial pressure of carbon dioxide is 18 atm and the saturation value for carbon dioxide in water is 18*3.4 grams/liter-atm=61 grams per liter at 0° C. Operation is chosen to be at ½ the saturation value of water so that carbon dioxide can be quickly absorbed by the water. As an example, a 370 MW natural gas fired electricity generation plant will generate about 10 kg of carbon and 36 kg of carbon dioxide. With a gas flow rate of roughly 1 $m^3$/sec and a water flow rate of roughly 1.2 $m^3$/sec, the bubbler will separate and transport this amount of carbon and carbon dioxide. Accounting for the 7:1 initial ratio of nitrogen to carbon dioxide in the gas, the water flowing out of the first stage will have 20 grams of carbon dioxide and 1.25 grams of nitrogen per liter. The carbon dioxide rich water is transported to a second gas chamber with a very low pressure, where the dissolved carbon dioxide and the much smaller amount of dissolved nitrogen bubble out of solution. This low pressure is maintained by another 150:1 gas compressor. In one embodiment, the rate of gas flow through this compressor is feedback controlled to maintain a pressure of 50 atm at its output and 0.33 atm at its input.

The exhaust gas ratio is 86% nitrogen to 12% carbon dioxide, when burning natural gas. After one stage of separation, the ratio is 6% nitrogen to 93% carbon dioxide. For some applications, a single stage of separation may be sufficient, so embodiments of this invention (not shown) may not include elements 307 through 310, with the output from compressor 306 feeding directly into exit pipe 311. However, further reduction of the nitrogen may make it easier to mix the carbon dioxide with water and to pump the mixture into a fracked well. In many cases, therefore, a second stage of separation comprising elements 307 through 310 will be used. The carbon dioxide concentration is higher and the gas flow is greatly reduced to about 0.4 $m^3$/sec. The concentration of carbon dioxide in the water is also greater. The water flow rate is also reduced to about 0.5 $m^3$/sec.

Figure 5A:
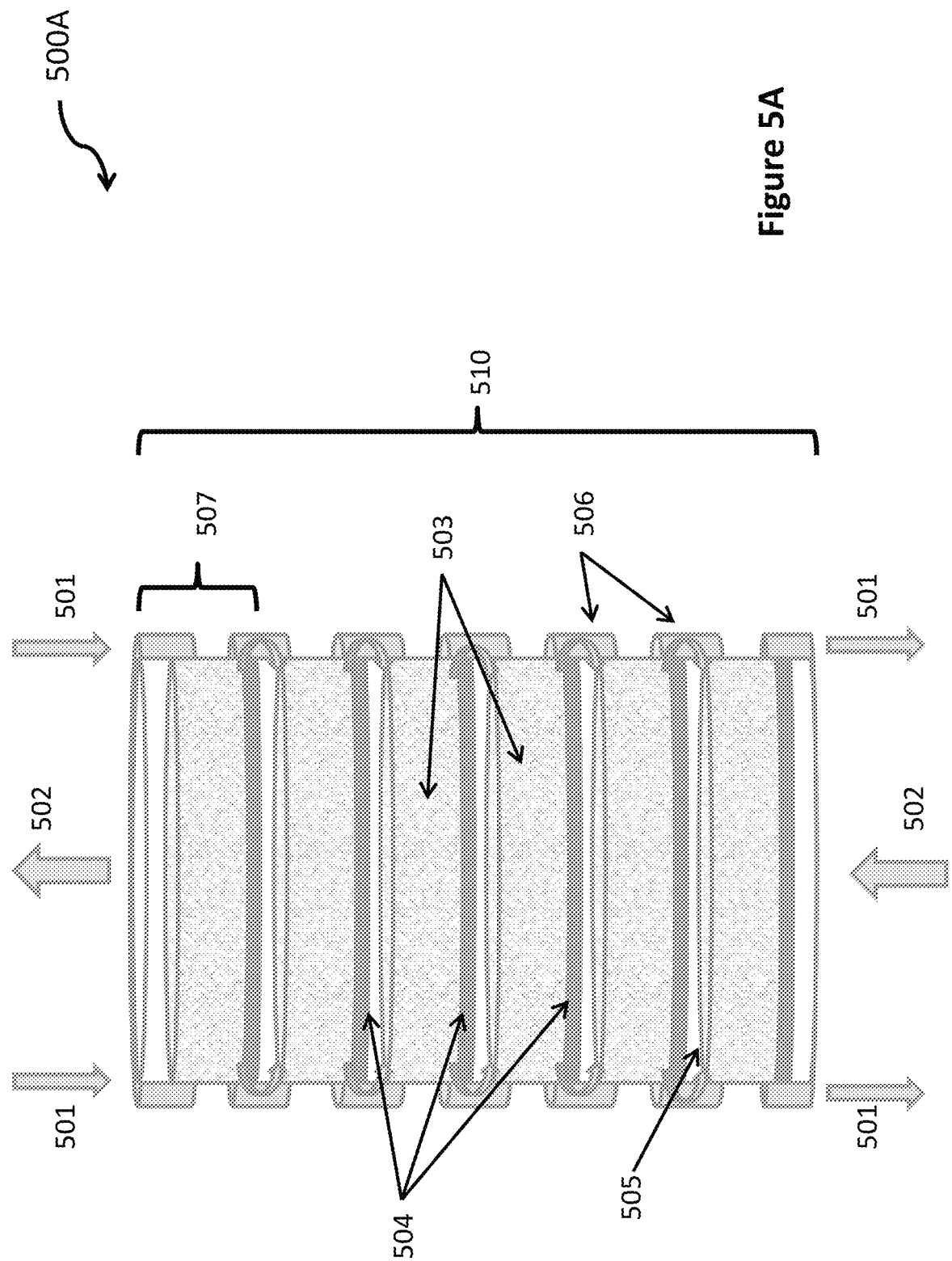
FIG. 5A is an illustration of a multi-chamber bubbler system within an apparatus according to one embodiment of the current invention.

A bubbler system 500A according to one embodiment of the invention is illustrated in FIG. 5A. This embodiment uses a counter flow, in which the water and gas flow in opposite directions. The gas is input where the water is output, and the gas is output where the water is input. However, in other embodiments, the water and gas may flow in the same direction, where gas and water are input at roughly the same location, and where gas and water are output at roughly the same location. Gas mixture 502 is introduced at the bottom and removed from the top of a chamber 510 containing water. Water flows in the opposite direction. Water 501 is introduced at the top and removed from the bottom of chamber 500, so it flows in the opposite direction to gas mixture 502. Chamber 510 comprises six sub-chambers 507 in the embodiment shown, but other embodiments may include fewer or more sub-chambers. A plate containing one or more spargers 504 is located at the bottom of each sub-chamber 507. In each sub-chamber, there is a layer of water 503 supported by the plate of spargers, and a layer of gas 505 present above the water. Water flows smoothly from one sub-chamber to the one below through an annulus 506 surrounding the sub-chambers and connecting from the bottom of one to the top of the next.

Figure 5B:
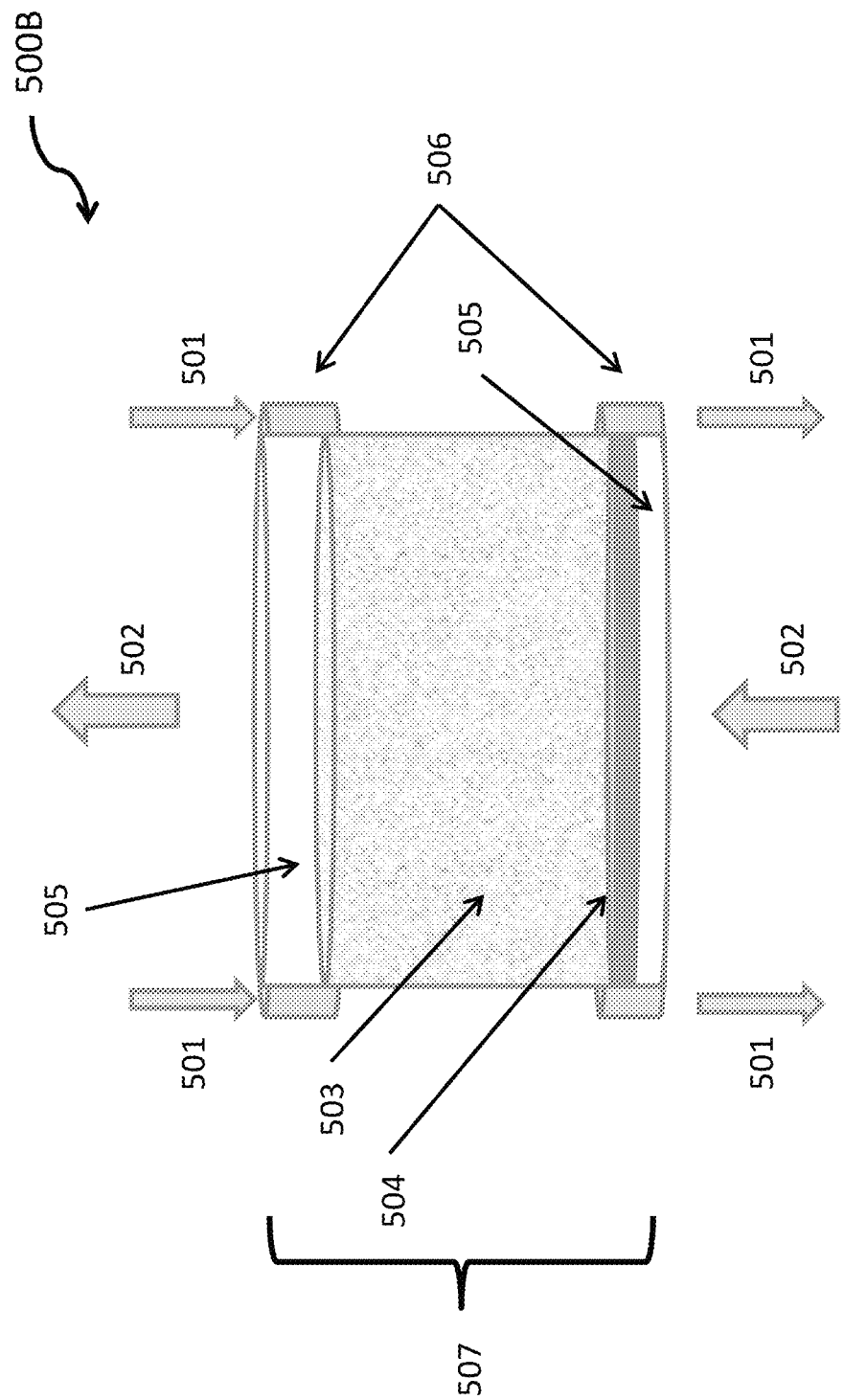
FIG. 5B is an illustration of a single-chamber bubbler system within an apparatus according to one embodiment of the current invention.

As one example, consider chamber 510 to be composed of only a single sub-chamber 507. This is illustrated in FIG. 5B. If the water is not mixed vertically, then in a single sub-chamber 507, the concentration of carbon dioxide in the water is high at the bottom of the sub-chamber, where the concentration of carbon dioxide in the bubbles is equal to its concentration in the exhaust gas. As the gas bubbles up through the water, carbon dioxide is absorbed from the bubbles into the water. If the water layer in a single sub-chamber is thick enough, when the bubbles reach the top of the water in the sub-chamber, almost all of the carbon dioxide will have diffused out of the bubbles and into the water. At the very top of the water, the concentration of carbon dioxide in the water and in the gas bubbles will be almost zero. Hence, all of the carbon dioxide will be in the water at the bottom of the chamber and most of the other gases in the original exhaust gas will escape from the top of the water and be collected. In this example, a single chamber would be sufficient to separate carbon dioxide from nitrogen and other trace gases in the exhaust of fossil fuel power plant.

In another example, with strong mixing of the water vertically within each sub-chamber, all of the water within a single sub-chamber will have a carbon dioxide concentration roughly equal to the average of the incoming and outgoing concentrations. The concentration of carbon dioxide will not be zero at the top of the water. For this example, a chamber 510 with multiple water sub-chambers 507, and with no mixing of the water between the sub-chambers will be required. The water from a sub-chamber above, with its average concentration of carbon dioxide will flow into the top of the sub-chamber below. Each chamber will absorb some of the carbon dioxide and reduce the carbon dioxide concentration in the exhaust gas and transfer the carbon dioxide to the water flowing through that chamber. The sub-chamber at the bottom will have the highest average concentration of carbon dioxide. Each successive sub-chamber above the bottom will have a lower average concentration of carbon dioxide. With multiple chambers, the carbon dioxide concentration in the gas and in the water will decrease chamber by chamber toward zero.

As is often the case, a variety of design optimizations are possible. One can use a greater water flow and absorb more carbon dioxide in each sub-chamber. This will reduce the number of sub-chambers and the amount of sparger area required. It will also reduce the concentration of carbon dioxide per liter of water in the flow. This will require reduced pressure in the receiving chamber to get all the carbon dioxide to leave the water and a greater compression ratio for the compressor after the receiving chamber. It will also require more water pumping energy. With a design that uses 50% of the saturation concentration of carbon dioxide in water, each sub-chamber will decrease the carbon dioxide concentration in the gas flow by about ½ (in the limit of thorough mixing of the water within each sub-chamber). Thus, with 8 sub-chambers, the carbon dioxide concentration in the gas flow will be reduced by 250× from 12% to 0.05%. Also, there are limits. The speed of the water flow down through the sub-chambers should be less than the speed of bubbles rising up.

In general, bubbles of any size are OK, but small diameter bubbles are better. In one embodiment, spargers are selected that produce small bubbles, less than 1 mm in diameter. In another embodiment, the bubble size is 0.2 mm in diameter on 0.4 mm centers. With 0.2 mm diameter bubbles on 0.4 mm centers, roughly 150 sq m of sparger surface area is required to support a gas flow rate of 1 m3/sec. The 0.2 mm diameter bubbles rise with a velocity of roughly 0.08 m/sec. Both the size of the holes or pores and the surface tension between the water and the surface coating of the sparger determine the diameter of the bubbles.

Small bubbles have several big advantages. First, the diffusion of gas across the diameter of the bubble and into water can occur in a few seconds. Second, the total amount of surface area of the water in contact with the gas is greatly increased. This enables almost all of the carbon dioxide that was inside the bubbles to dissolve in the water in a few seconds. Third, small bubbles do not tend to stir the water much. Less stirring results in less mixing. Less mixing enables a higher percentage of the carbon dioxide to be absorbed in each water chamber. In turn, fewer sub-chambers are required. Finally, small bubbles rise in water more slowly than large bubbles. The rate of rise is roughly proportional to the diameter. With a slower rate of rise, there is more time for the carbon dioxide to diffuse out of the bubbles and be absorbed into the water. Combining all these effects, smaller bubbles will result in fewer sub-chambers and in a lower height of water in each sub-chamber.

If the bubble size is large and the water at the top and bottom of each water layer are well mixed, then the separating system will require multiple sub-chambers of water as shown in FIG. 5A. However, with very small bubbles, circa 0.2 mm in diameter, there is very little mixing of the water from the bottom to the top. Then, it is possible to use fewer chambers and maybe a single chamber 500B, as shown in FIG. 5B. Since each chamber requires its own set of spargers to bubble the gas through the water, fewer chambers will reduce the number of spargers and reduce the total cost. However, even with multiple chambers, as shown in FIG. 5A, the cost of separating system will be less than a few percent of the capital cost of the electricity generating facility that it serves.

In some embodiments, such as that shown in FIGS. 2 and 3, after the carbon dioxide and water are separated, the remaining gases are de-compressed (i.e. expanded). This can be done by allowing them to pass through a multi-stage rotary turbine or a multi-stage centrifugal expander 215, 304. Whereas a compressor is designed to accept a higher pressure in each subsequent stage, an expander is designed to accept a lower pressure in each subsequent stage. As with the compressor, the expander is designed to create a small amount of pressure change in each stage. With good heat transport for each stage, it also operates very close to isothermally, thereby achieving very good energy efficiency.

In one embodiment, the nitrogen separated from the carbon dioxide in the second stage of separation 313 is small and is released directly into the atmosphere. In another embodiment, where expander 304 is a multi-stage expander, the nitrogen can be introduced into a later stage of the multi-stage expander 304. In each stage of a multi-stage expander, the pressure decreases. The output 313 is added to the overall gas flow through the expander 304 at the stage where the internal pressure of that stage matches the pressure of the nitrogen gas from the second stage of carbon dioxide separation 313. In one embodiment, the compressor 302 and the expander 310 are driven from a single rotary shaft. The energy recovered by expanding the other gases (mostly nitrogen) is used directly to drive the compressor. This is similar to the design of a jet engine and improves the overall efficiency of the process. Also, the heat produced during compression is transported to the expander to provide the heat consumed during expansion.

In one embodiment, after the carbon dioxide is separated, it is compressed to a pressure of 75 atm or greater. In FIG. 3, this final compression occurs at compressor 310. It is also controlled by feedback to produce a low pressure in chamber 309 to allow the carbon dioxide to escape from solution. For example, with a compression of 150 and the output pressure maintained at 75 atm, the pressure at the input will be 0.5 atm. The flow rate of the gas through the compressor is controlled to achieve the desired input and output pressures. At a partial pressure of 75 atm., the amount of carbon dioxide that dissolves in water is about 1.4 moles per liter of water. At lower pressures, the amount dissolved decreases linearly at a rapid rate. At higher pressures, the amount dissolved increases at an asymptotically slower rate (see FIG. 4A). At 500 atm, it is only 1.75 moles per liter of water. The energy required to compress the exhaust favors lower values for the final pressure. However, the energy required to pressurize the water and force it into the cracks, crevices and pores of the fracked rock at the bottom of the fracked cavern or well, favors higher pressures and higher concentrations of carbon dioxide dissolved in the water. In various embodiments of this invention, the partial pressure of carbon dioxide at the output of the separator is in the range of 30-150 atm. Choosing a partial pressure of circa 75 atm for the carbon dioxide going into the fracked caverns or wells is a compromise and may be close to an optimum. A partial pressure of carbon dioxide pressure at or above 73 atm allows the carbon dioxide to liquefy. Liquid carbon dioxide will be mixed with water, when the amount of water available is insufficient to dissolve all the carbon dioxide.

Figure 6:
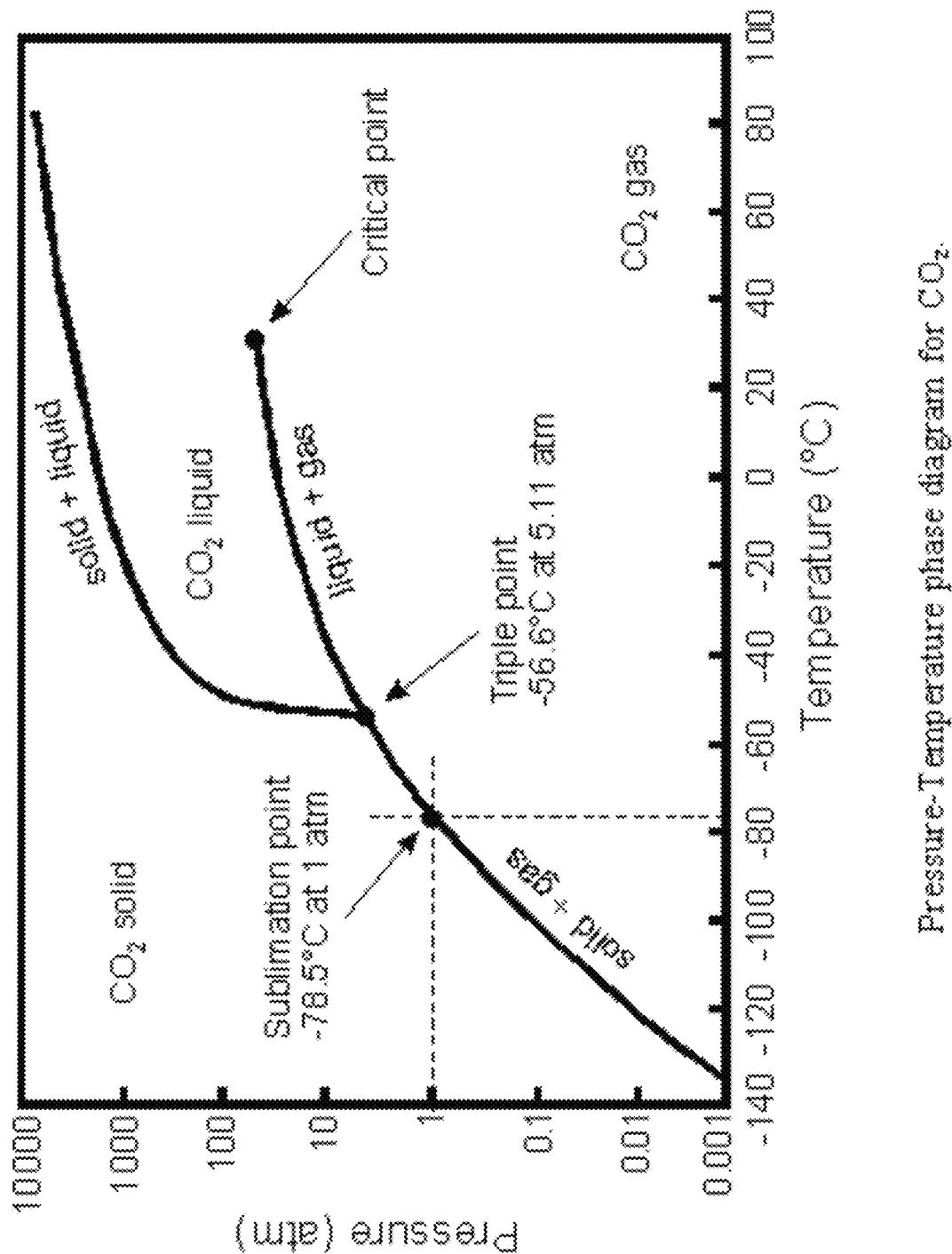
FIG. 6 (Prior Art) is a phase diagram for carbon dioxide that shows the ranges of temperature and pressure for which carbon dioxide is a liquid.

Provided that the partial pressure of carbon dioxide is above 73 atm, and the temperature is below 31 C, some of the carbon dioxide will liquefy, and can also be collected from a low point in the chamber. If the temperature is much lower than 31° C., the pressure can be reduced somewhat and still liquefy the carbon dioxide. FIG. 6 is a phase diagram for carbon dioxide that shows the ranges of temperature and pressure for which carbon dioxide is a liquid.

Some approaches propose simply to compress the exhaust gas and separate the carbon dioxide by liquefying it. However, with an initial mixture that is only 12% carbon dioxide, the gas mixture would have to be compressed 630 times to 630 atm to raise the partial pressure of the carbon dioxide in the mixture to 75 atm. Therefore, with total pressure below 630 atm, the carbon dioxide will remain in the gas phase, and gaseous nitrogen must be separated from gaseous carbon dioxide by other means. Even with 20% carbon dioxide, the exhaust would have to be compressed to 350 atm to obtain a partial pressure for carbon dioxide above 70 atm. This is possible, but not easy or inexpensive.

In another embodiment, the input exhaust gas is compressed by a factor of 300. Starting with 12% carbon dioxide, the partial pressure of carbon dioxide after compression becomes 36 atm. Then, the carbon dioxide can be forced to liquefy by chilling the compressed gas to about −50° C. At this temperature about 85% of the carbon dioxide will be liquid. But, care must be taken not to overchill the compressed gas below −55° C. and cause it solidify. The liquid carbon dioxide can be removed and the remaining gas (mostly nitrogen and unseparated carbon dioxide) can be piped to an expander to recover the compression energy. This method of separation is also possible, but may be more expensive and less energy efficient than using water, as described above. Also, with this method, it is difficult to capture more than 85% of the carbon dioxide. Therefore, in one embodiment of this invention, the carbon dioxide is first separated by bubbling it through water and then the almost pure carbon dioxide is compressed above 75 atm. Liquid carbon dioxide is removed from a low point in the compressor.

The goal is to have at least 2 molecules of water for each molecule of carbon dioxide when the mixture reacts with the rock. This is the minimum amount of water necessary for the reaction with some rock. Based on their weights, we would have 36 kg of water and 44 kg of liquid carbon dioxide. Since the density of the two liquids is approximately the same, we would have 1 part of liquid water mixed with 1.25 parts of liquid carbon dioxide. In practice, it is better to have a little more water than this minimum, and use a 1:1 mixture as a practical minimum. (Henceforth, a 1:1 ratio of water to carbon dioxide will be labeled "the reference mixture".) This "reference mixture" has a concentration of carbon dioxide that is well above the amount that will dissolve in water. Therefore, it is a mixture of liquid carbon dioxide and water, rather than a solution of carbon dioxide in water. In the "reference mixture" some of the carbon dioxide will dissolve in the water to form a solution, but the amount is small in comparison with the total amount of carbon dioxide in the "reference mixture". Whenever carbon dioxide is dissolved in water, if there is any empty space above or around the water, it will be filled with carbon dioxide gas.

More or less water than in the 1:1 ratio of the "reference mixture" may be required, depending on the type of rock and the amount of hydration or free water in the rock. The actual ratio will tuned for the type of rock and the amount of water present in the rock of each cavern or well. If the required amount of water cannot be captured from the exhaust gases of some fuels, then it will be added from a supply of fresh water or ocean water.

Water is a polar liquid and carbon dioxide is a non-polar liquid. Like oil and water, they do not easily mix. In one embodiment, they are mixed by intense agitation. In another, they are mixed by jetting one liquid into the other through tiny offices. In another, a combination of both is used. These processes are similar to the processes used to homogenize milk. In another embodiment, ultrasonic agitation is added to one or both of the above embodiments to break each of the liquids into very small droplets that are interspersed with droplets of the other liquid. The combination of a mechanical agitation and an ultrasonic agitation is illustrated in FIG. 7.

Figure 7:
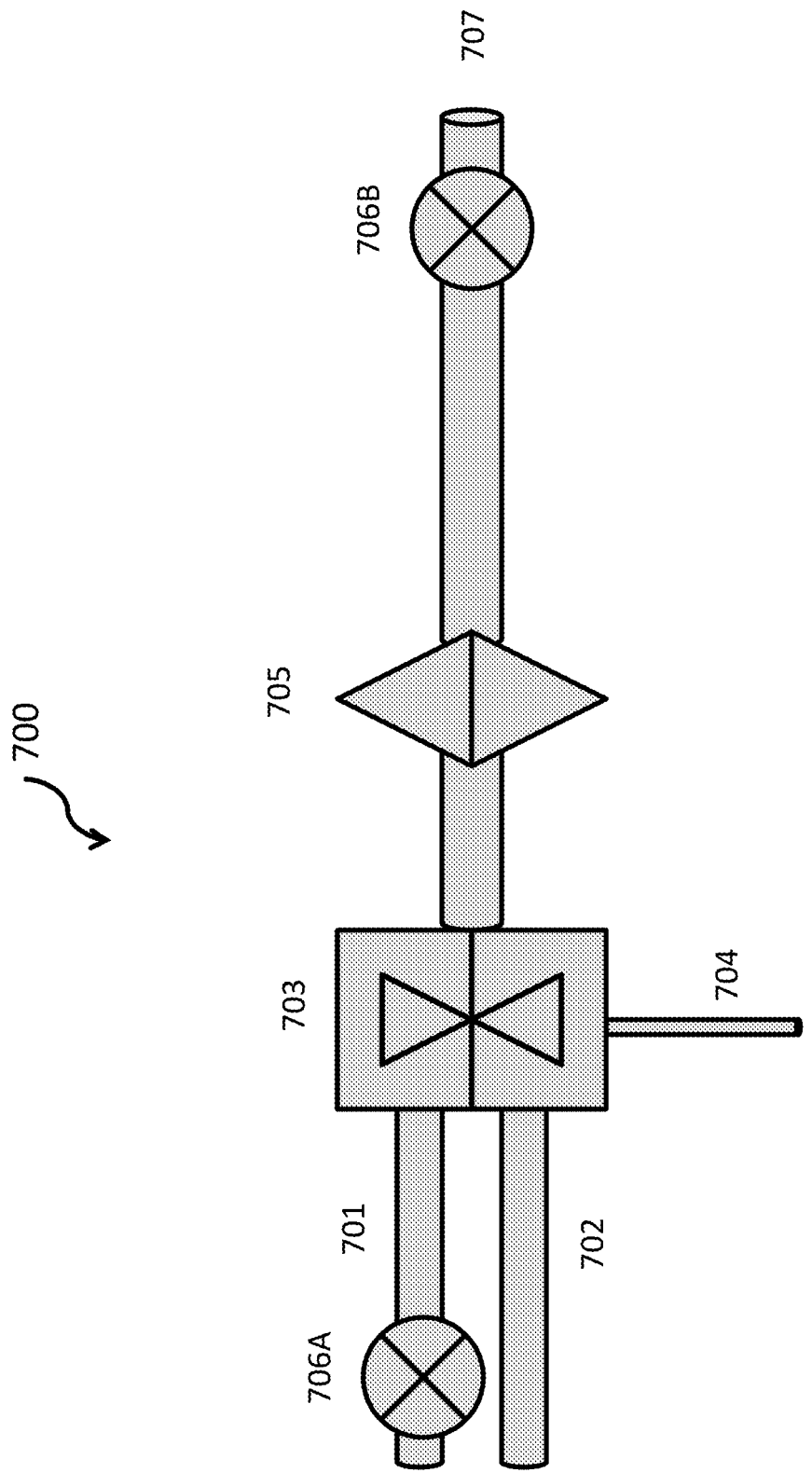
FIG. 7 is an illustration of a mixer within an apparatus according to one embodiment of the current invention.

FIG. 7 schematically illustrate a mixing apparatus 700 according to two embodiments. Water is compressed by pump 706A and provided to a mechanical mixer 703. Liquid and/or gaseous carbon dioxide, previously compressed to 75 atm or higher is added via inlet 702. After mechanical mixing, the mixture is optionally passed through an ultrasonic mixer 705. Finally, pump 706B pumps the mixture through pipe 707 to a fracked cavern or well. In one embodiment, minimal water is used and the mixture is comprised of water with dissolved carbon dioxide, liquid carbon dioxide and some gaseous carbon dioxide. In another embodiment, ample water is used to dissolve all of the carbon dioxide to create a solution of water and carbon dioxide. When liquid carbon dioxide is present, optionally, a surfactant can be added at mixer input port 704 to improve mixing by lengthening the time before the small domains recombine and the two liquids separate. Surfactants for liquid carbon dioxide are available and more are being developed. Small molecules that are polar at one end and non-polar at the other are preferred. One example is polyoxyethylene. Unfortunately, surfactants for mixtures of liquid carbon dioxide and liquid water tend to be expensive at this time, and may be too expensive for this application. Also, they may be toxic and inappropriate for underground use.

As an example, a 370 MW electricity generating facility produces 10 kg of carbon per second. At a ratio of 1:1, it requires about 37 liters of water and 37 liters of liquid carbon dioxide per second. With a 6" diameter pipe leading into the fracked cavern or well, the flow rate for this mixture would be about 4 meters/sec. If the pipe from the surface to the fracked rock is 2 km, it will require 400 seconds for the mixture to reach the area of fracked rock, where the reaction with the rock takes place. Of course, it is desirable for the mixture to not separate for as long as possible. However, 1000 seconds will allow it to reach the cracked rock and penetrate deep into the cracks and crevices. With aggressive agitation and ultrasonic agitation, the mixture will resist separation for several thousand seconds.

The goal is for the water and the liquid carbon dioxide to flow together, to the same locations. Even if the mixture does separate to some extent, both liquids are likely to flow equally to the locations at which the reactions with the rock take place. Their density and viscosity are very similar, favoring their likelihood of flowing together, even if not well mixed. Finally, at a flow rate of 4 m/sec in a 0.15 m diameter pipe, the Reynolds number is very high, 600,000. The flow will be turbulent. This will help to keep the mixture well mixed as it flows down the pipe. Even if the mixture from a single 370 MW natural gas electricity generating facility is split among 10 fracked caverns or wells, the turbulence is still strong. The narrow pipe and limited flow rate is another reason for using less water and a mixture of carbon dioxide gas, carbon dioxide liquid and water.

In some embodiments of the invention, where ample water (fresh or sea water) is available, all the carbon dioxide would be completely dissolved in the water. This would require about 16 times more water or 600 liters of water per second for a 370 MW electricity generating facility. (The Reynolds number for a single 6" pipe is now 10 million.) For these embodiments, with ample water, all of the liquid and gaseous carbon dioxide is dissolved in the water. The "mixture" becomes a single liquid: water with dissolved carbon dioxide. The mixing apparatus may include mechanical mixing, jetting the liquid carbon dioxide into the water, and bubbling the gaseous carbon dioxide into the water through a plate of spargers. The mixing apparatus is necessary to encourage the carbon dioxide to dissolve quickly into the water. The carbon dioxide in either gas or liquid form is pressured to 75 atm at which 1.4 moles of carbon dioxide will dissolve in one liter of water. With 600 liters of water per second, the water will dissolve 840 moles of carbon dioxide, containing 10 kg of carbon. This is approximately the amount of carbon produced per second by a 370 MW electricity generating facility.

Figure 8:
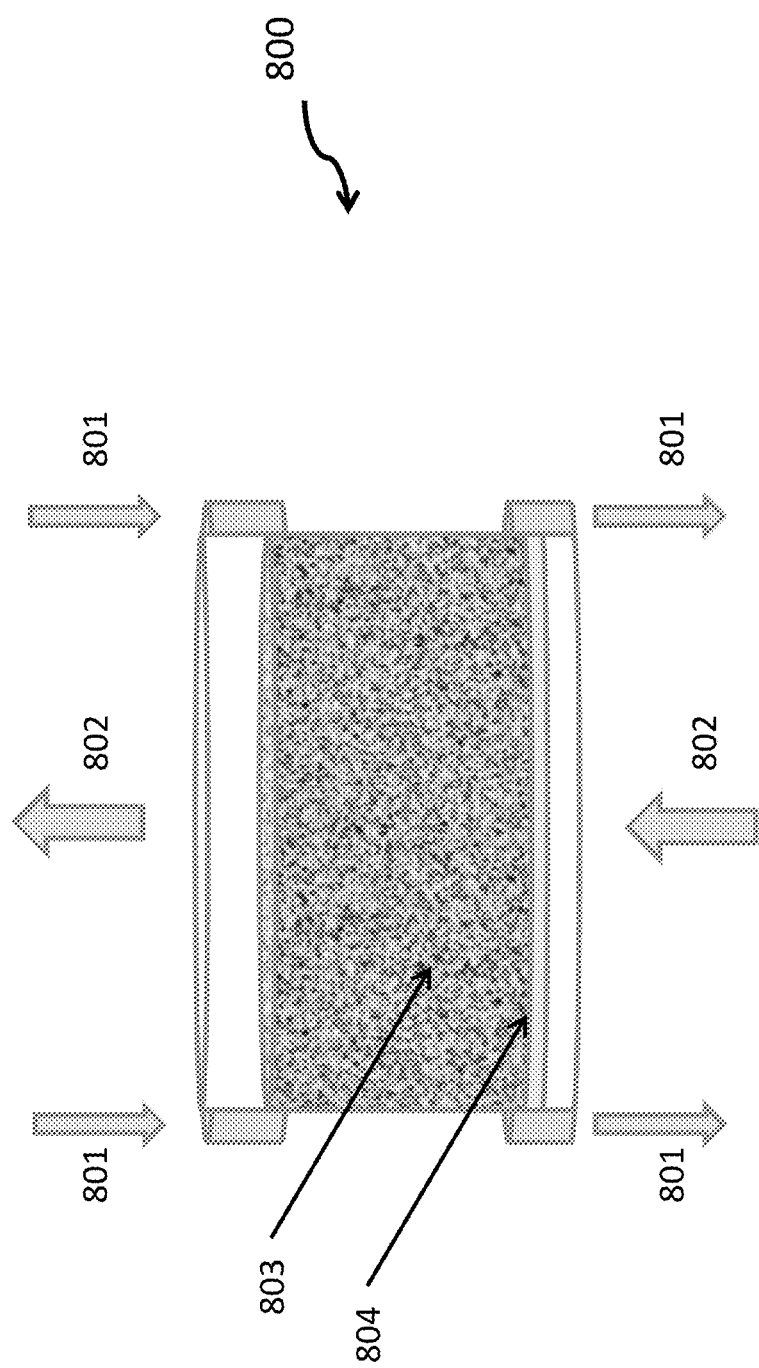
FIG. 8 is an illustration of a mixer within an apparatus according to yet another embodiment of the current invention.

FIG. 8 schematically illustrates an apparatus 800 used in such "ample water" cases. The mixture of carbon dioxide gas and liquid 802 is introduced at the bottom of a chamber 803 filled with water and flows toward the top. Water 801 is introduced at the top and removed from the bottom of chamber 803, so it flows in the opposite direction to gas mixture 802. A plate of spargers 804 bubble the gas into the water within the chamber 803. Almost all the carbon dioxide will be absorbed into the water.

As long as the pressure is 75 atm or greater, the carbon dioxide will stay in solution in the water until it is used up by reacting with the rock. At any depth from the surface below 750 m, the pressure will be above 75 atm. Even at 300 m below the surface, the pressure is 30 atm and the concentration of carbon dioxide in water would still be 1 molar. Most fracked wells lie much deeper, often 1.6 km below the surface. The carbon dioxide in solution will be used up by reacting with rock before it can travel 850 m vertically to reach a depth of 750 m below the surface.

In one embodiment of the present invention, gas or electrical energy is used to compress the exhaust gas, most of which is recovered when the nitrogen is expanded. Energy is also used to compress the gas after each stage of carbon dioxide separation. These three steps use about 3.5 MJ per kg of carbon. When burning natural gas, an additional 0.25 MJ of electricity per kg of carbon is required to condense the water vapor from room temp to 0 C. The energy to pump the water into the fracked well is small. Burning natural gas with 50% efficiency to generate electricity produces 37 MJ per kg of carbon. Therefore, the energy to capture, separate and sequester carbon dioxide into a fracked well is about 10% of the electrical energy produced. In the embodiment where water is abundant and the carbon dioxide is completely dissolved in the water, about 0.5 MJ per kg of carbon of extra energy is require to pressurize the water. For this case, the amount of energy used to capture, separate and sequester carbon dioxide is about 11% of the electrical energy produced. This is much lower than other methods in the prior art and would make sequestering of carbon dioxide cost effective.

For coal, the amount of energy to capture, separate and sequester the carbon dioxide is about the same. But, the amount of electricity energy produces per kg of carbon is about 2.5-3× less. Hence, the percentage of electrical energy required to capture, separate and sequester is greater, about 25-30%.

Not included in this calculation is the energy to remove particles and heavy metals from the exhaust of a coal burning electricity generating facility.

Figure 9:
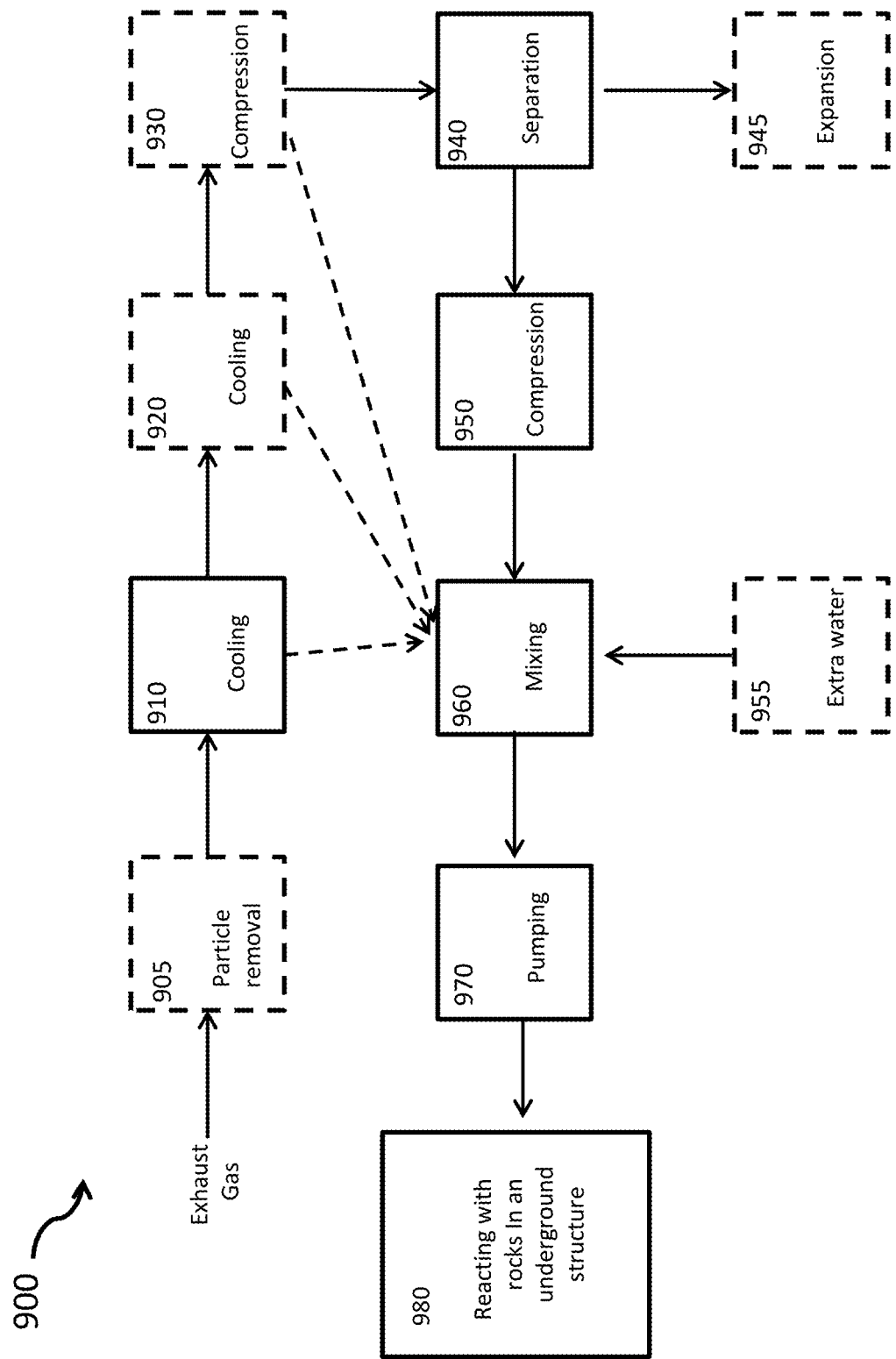
FIG. 9 is a flow diagram of a method according to some embodiments of the current invention.

FIG. 9 illustrates in flowchart form a method of practicing the present invention according to one embodiment. At optional step 905, exhaust gas, collected from electricity generating faculties that burn fossil fuels and create carbon dioxide, is filtered to remove particulates. At step 910, the exhaust gas is cooled to room temperature. Liquid water is collected and provided to mixer 960. At optional step 920, the room temperature gas is cooled further to approach 0 C. Liquid water is collected and provided to mixer 960.

At step 930, the cooled, dried exhaust gas is compressed to a pressure between 10-500 atm. In one embodiment the pressure is 150 atm. This compression step liquefies the remaining water vapor and compresses the remaining mixture of carbon dioxide and other gases, primarily nitrogen. In another embodiment of the invention, compression step 930 is omitted, leaving the gas mixture at a pressure of 1 atm.

At step 940, carbon dioxide in the exhaust gas mixture is separated from the nitrogen and other gases. In one embodiment, separation is accomplished by bubbling the exhaust gas through water and recovering the dissolved carbon dioxide from the water. At step 945, a significant fraction of the energy used for compressing the exhaust gas at step 930 may be recovered by decompressing the residual gas from which the carbon dioxide has been removed at separation step 940.

At step 950, the separated carbon dioxide is compressed to a pressure of 75 atm or greater at a temperature of less than 31 C or a combination of pressure and temperature so that it will readily liquefy. At step 960, the liquefied carbon dioxide is mixed with water provided from cooling steps 910 and 920 to form a concentrated mixture. If extra water is available and inexpensive, it is introduced at step 955, and compressed to the same pressure as the pressurized carbon dioxide before it is mixed with it at step 960. If extra water is not available and inexpensive, step 955 is omitted. At step 960, the liquid carbon dioxide and the liquid water are mixed and, optionally, broken into small domains, to create a long-lasting suspension of each liquid in the other. A surfactant may be added to prolong the suspension of liquid carbon dioxide in liquid water. If sufficient extra water is available to completely dissolve all of the carbon dioxide, then carbon dioxide gas and liquid are mixed or bubbled through the water until all of the carbon dioxide has dissolved.

At step 970, the pressurized mixture of water with the dissolved carbon dioxide plus any liquid or gaseous carbon dioxide with a pressure in the range of 30 atm to 150 atm is pumped into an underground structure with cracked and fractured rock (980) (as described previously), where the carbonic acid in the water from the dissolved carbon dioxide will react with the surface of broken, cracked and fractured rock to form soluble and insoluble carbonates and bi-carbonates, and where the soluble carbonates and bi-carbonates will eventually become insoluble carbonates as the carbon dioxide and the carbonic acid are consumed and the pH of the solution rises.

As noted above, the underground structure to which the pressurized output mixture is delivered may either be a well that has already been depleted of natural gas and/or oil, or a well that is deliberately constructed to be used for carbon sequestration. It will be less expensive to use a depleted well whenever possible. In either case, deep within the earth, there is likely to be an abundance of rock that will react with carbonic acid in the output mixture to form carbonates.

Embodiments of the present invention allow for the cost-effective, water and energy-efficient sequestration of carbon dioxide, present in gaseous form in the exhaust of fossil-fuel burning electricity generating facilities, in a solid form. Embodiments make use of improved techniques of separation, mixing, and injection into fractured and cracked rock in and around underground structures, such as caverns or wells.

The invention claimed is:

1. An apparatus for sequestering carbon dioxide in an underground structure, comprising fractured and cracked rock; the apparatus comprising:
   a separator that operates on an input gas mixture comprising carbon dioxide gas and one or more other gases, providing a separated carbon dioxide gas output:
   a compressor that compresses the separated carbon dioxide gas output to a pressure in a predetermined pressure range, providing a second output comprising at least one of gaseous carbon dioxide and liquid carbon dioxide;
   a mixer that provides a third output by mixing the second output with liquid water at a pressure in the predetermined pressure range, the third output comprising:
      at least one of liquid carbon dioxide and gaseous carbon dioxide; and
      water with dissolved carbon dioxide; and
   a pump that pumps the third output into the underground structure under a pressure in the predetermined pressure range, such that components of the third output react with the fractured and cracked rock in and around the underground structure to form stable carbonates.

2. The apparatus of claim 1, where the predetermined pressure range is between 30 and 150 atm.

3. The apparatus of claim 1, wherein, in a first stage of the separator, the input gas mixture is compressed to a pressure in a second pressure range and is then directed to flow as a flowing gas mixture to an array of bubblers that form the flowing gas mixture into bubbles and inject the bubbles into flowing water, such that the carbon dioxide gas in the bubbles preferentially dissolves in the flowing water, and all or almost all of the one or more other gases in the bubbles preferentially pass through the flowing water without dissolving therein; and
   wherein, in a second stage of the separator, to which the flowing water is directed after passage through the first stage, the preferentially dissolved carbon dioxide emerges from the flowing water as the separated carbon dioxide gas output.

4. The apparatus of claim 3, wherein the water flows through the first stage of the separator in a first direction, and the compressed input gas mixture is bubbled through the flowing water in a second direction, opposite to the first direction.

5. The apparatus of claim 3, wherein the first stage of the separator comprises a vertical stack of sub-chambers, the vertical stack comprising a bottom sub-chamber, a top sub-chamber, and optional other sub-chambers therebetween, each sub-chamber having a top and a bottom;
   wherein each sub-chamber comprises a layer comprising a plurality of bubblers, a layer of flowing water, and a layer of space above the water; such that water introduced into the top sub-chamber flows vertically downwards through the stack of sub-chambers, exiting from the bottom of the bottom sub-chamber as a first output to be delivered to the second stage of the separator, while the compressed input gas mixture is introduced at the bottom of the bottom sub-chamber to pass vertically upwards through the stack of sub-chambers, such that in each sub-chamber the gas mixture passes first through the plurality of bubblers in that sub-chamber to form bubbles that rise through the layer of flowing water and empty out into the layer of space above water in that sub-chamber ready to enter the plurality of bubblers in the sub-chamber immediately above, until gas collecting in the space in the top sub-chamber is provided as a second output from the separator.

6. The apparatus of claim 5, wherein in each layer of bubblers, each bubbler of the plurality of bubblers is configured to produce bubbles less than 1 mm in diameter.

7. The apparatus of claim 3, wherein the first stage of the separator has only one sub-chamber, the sub-chamber having a bottom and a top, and the sub-chamber comprising a plurality of bubblers, a layer of flowing water and a space above the layer of flowing water, such that water introduced into the top of the sub-chamber flows vertically downwards, exiting from the bottom of the sub-chamber, while the compressed input gas mixture is introduced at the bottom of the sub-chamber to pass through the plurality of bubblers to form bubbles that rise through the layer of flowing water and empty out into the layer of space above the layer of flowing water, being provided as an output;
   wherein no vertical mixing of the water occurs within the chamber.

8. The apparatus of claim 3, where the second pressure range is 5 to 500 atm.

9. The apparatus of claim 1, where the compressor is a multi-stage rotary turbine or multi-stage centrifugal compressor, with a compression ratio of less than 2:1 in each stage, providing sufficient heat transfer to maintain gas temperature within 30 C of ambient temperature.

10. The apparatus of claim 1, additionally comprising a cooling apparatus that cools a mixture of input gases containing water, carbon dioxide, and one or more other gases to liquefy and collect the water, providing the remainder of the mixture to the separator as the input gas mixture comprising carbon dioxide gas and one or more other gases, and providing the collected water to the mixer.

11. The apparatus of claim 1, where the mixer mixes components of the third output by one or more of: mechanical mixing, jetting one liquid component into another, bubbling a gaseous component through a liquid component, and ultrasonic agitation.

12. A system for sequestering carbon dioxide; the system comprising:
   an underground structure, comprising fractured and cracked rock;
   a separator that operates on an input gas mixture comprising carbon dioxide gas and one or more other gases, providing a separated carbon dioxide gas output;
   a compressor that compresses the separated carbon dioxide gas output to a pressure in a predetermined pressure range, providing a second output comprising at least one of gaseous carbon dioxide and liquid carbon dioxide;
   a mixer that provides a third output by mixing the second output with liquid water at a pressure in the predetermined range, the third output comprising:
      at least one of liquid carbon dioxide and gaseous carbon dioxide; and
      water with dissolved carbon dioxide; and
   a pump that pumps the third output into the underground structure under a pressure in the predetermined range, such that components of the third output react with the fractured and cracked rock in and around the underground structure to form stable carbonates.

13. The system of claim 12, where the predetermined pressure range is between 30 atm and 150 atm.

14. The system of claim 12,
   wherein, in a first stage of the separator, the input gas mixture comprising carbon dioxide gas and one or more other gases is compressed to a pressure in a second pressure range and then is directed to flow as a flowing gas mixture to an array of bubblers that form the flowing gas mixture into bubbles and inject the bubbles into flowing water, such that the carbon dioxide gas in the bubbles preferentially dissolves in the flowing water, and all or almost all of the one or more other gases preferentially pass through the flowing water without dissolving therein;

wherein the flowing water containing the preferentially dissolved carbon dioxide gas is transported from the first stage of the separator to a second stage of the separator; and wherein, in the second stage, the preferentially dissolved carbon dioxide emerges from the flowing water as the separated carbon dioxide gas output.

15. The system of claim 12, where the predetermined pressure range is between 5 atm and 500 atm.

16. A method for sequestering carbon dioxide underground in an underground structure, comprising fractured and cracked rock; the method comprising:
- a first method for separating carbon dioxide gas from one or more other gases in an input gas mixture to provide a separated carbon dioxide gas output;
- a second method for compressing the separated carbon dioxide gas output to a pressure in a predetermined range, providing a second output comprising at least one of gaseous carbon dioxide and liquid carbon dioxide;
- a third method for providing a third output mixture by mixing the second output with liquid water at a pressure in the predetermined range, the third output mixture comprising:
  - at least one of liquid carbon dioxide and gaseous carbon dioxide; and
  - water with dissolved carbon dioxide; and
- a fourth method for pumping the third output mixture under a pressure in the predetermined range into the underground structure, such that components of the third output mixture react with the fractured and cracked rock in and around the underground structure to form stable carbonates.

17. The method of claim 16, where the first method for separating carbon dioxide gas from one or more other gases in an input gas mixture comprises:
- first, compressing the input gas mixture to a pressure between 5 and 500 atm;
- second, directing the compressed input gas mixture to flow as a flowing gas mixture to an array of bubblers that form the flowing gas mixture into bubbles and inject the bubbles into flowing water, such that the carbon dioxide gas preferentially dissolves in the flowing water, and all or almost all of the one or more other gases preferentially pass through the flowing water without dissolving therein; and
- third, arranging for the preferentially dissolved carbon dioxide to emerge from the flowing water as the separated carbon dioxide gas output.

18. The method of claim 16 where the predetermined pressure range is between 30 and 150 atm.

* * * * *